(12) United States Patent
Abedini et al.

(10) Patent No.: US 11,871,480 B2
(45) Date of Patent: Jan. 9, 2024

(54) SIGNALING TO SUPPORT MOBILE INTEGRATED ACCESS AND BACKHAUL

(71) Applicant: QUALCOMM Incorporated, San Diego, CA (US)

(72) Inventors: Navid Abedini, Basking Ridge, NJ (US); Karl Georg Hampel, Jersey City, NJ (US); Jianghong Luo, Skillman, NJ (US); Naeem Akl, Bridgewater, NJ (US); Luca Blessent, Whitehouse Station, NJ (US); Tao Luo, San Diego, CA (US); Junyi Li, Fairless Hills, PA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 17/817,765

(22) Filed: Aug. 5, 2022

(65) Prior Publication Data
US 2022/0377527 A1 Nov. 24, 2022

Related U.S. Application Data

(63) Continuation of application No. 16/947,496, filed on Aug. 4, 2020, now Pat. No. 11,445,356.
(Continued)

(51) Int. Cl.
*H04W 4/00* (2018.01)
*H04W 8/08* (2009.01)
(Continued)

(52) U.S. Cl.
CPC ............... *H04W 8/08* (2013.01); *H04W 8/14* (2013.01); *H04W 84/005* (2013.01); *H04W 88/08* (2013.01); *H04W 92/20* (2013.01)

(58) Field of Classification Search
CPC .......... H04W 8/00; H04W 8/08; H04W 8/10; H04W 8/12; H04W 8/14; H04W 8/16;
(Continued)

(56) References Cited

U.S. PATENT DOCUMENTS

2015/0172907 A1 6/2015 Jung et al.
2018/0076839 A1 3/2018 Baghel et al.
(Continued)

FOREIGN PATENT DOCUMENTS

CN 109257212 A 1/2019
WO WO-2011131225 A1 * 10/2011 ........ H04W 36/0083
(Continued)

OTHER PUBLICATIONS

"3rd Generation Partnership Project; Technical Specification Group Radio Access Network; Study on Integrated Access and Backhaul; (Release 15)", 3GPP Draft, 38874-100_MCC, 3rd Generation Partnership Project (3GPP), Mobile Competence Centre, 650, Route Des Lucioles, F-06921 Sophia-Antipolis Cedex, France, Dec. 9, 2018 (Dec. 9, 2018), 3GPP TR 38.874, No. 1.0.0 (Dec. 2018), XP051552506, pp. 1-111, Retrieved from the Internet: URL: http://www.3gpp.org/ftp/Meetings%5F3GPP%5FSYNC/RAN/Docs/RP%2D182329%2Ezip, [retrieved on Dec. 9, 2018], paragraph [6.3.1], paragraph [9.7.5], figures 6.3.1-1 figures 9.7.5-2, clauses 7.2.2. 7.3.2. 7.3.3. 7.7. 9.6.2.
(Continued)

*Primary Examiner* — Matthew W Genack
(74) *Attorney, Agent, or Firm* — Kevin M. Donnelly; Harrity & Harrity, LLP

(57) ABSTRACT

Various aspects of the present disclosure generally relate to wireless communication. In some aspects, a wireless communication device may receive mobility state information associated with an integrated access backhaul (IAB) node. The mobility state information may include information
(Continued)

associated with at least one of: a level of mobility of the IAB node, or a change in mobility of the IAB node. The wireless communication device may perform an operation based at least in part on the mobility state information associated with the IAB node. In some aspects, a wireless communication device may determine that mobility state information associated with an IAB node is to be transmitted, and may transmit the mobility state information associated with the IAB node based at least in part on the determination. Numerous other aspects are provided.

24 Claims, 9 Drawing Sheets

Related U.S. Application Data

(60) Provisional application No. 62/884,584, filed on Aug. 8, 2019.

(51) Int. Cl.
  *H04W 8/14* (2009.01)
  *H04W 84/00* (2009.01)
  *H04W 88/08* (2009.01)
  *H04W 92/20* (2009.01)

(58) Field of Classification Search
  CPC ............. H04W 36/00; H04W 36/0005; H04W 36/0011; H04W 36/0016; H04W 36/0083
  See application file for complete search history.

(56) References Cited

U.S. PATENT DOCUMENTS

| 2019/0124696 A1 | 4/2019 | Islam et al. | |
| 2019/0132847 A1 | 5/2019 | Abedini et al. | |
| 2021/0044958 A1 | 2/2021 | Abedini et al. | |
| 2021/0227435 A1* | 7/2021 | Hsieh | H04W 36/08 |
| 2021/0259051 A1* | 8/2021 | Latheef | H04W 40/22 |

FOREIGN PATENT DOCUMENTS

| WO | WO-2015063371 A1 * | 5/2015 | ............ H04W 16/32 |
| WO | WO-2019246446 A1 | 12/2019 | |

OTHER PUBLICATIONS

International Preliminary Report on Patentability—PCT/US2020/070368, The International Bureau of WIPO—Geneva, Switzerland, dated Feb. 17, 2022.
International Search Report and Written Opinion—PCT/US2020/070368—ISA/EPO—dated Oct. 29, 2020.

\* cited by examiner

SIGNALING TO SUPPORT MOBILE INTEGRATED ACCESS AND BACKHAUL

CROSS-REFERENCE TO RELATED APPLICATIONS

This application is a continuation of U.S. patent application Ser. No. 16/947,496, filed Aug. 4, 2020, entitled "SIGNALING TO SUPPORT MOBILE INTEGRATED ACCESS AND BACKHAUL," which claims priority to U.S. Provisional Patent Application No. 62/884,584, filed on Aug. 8, 2019, entitled "SIGNALING TO SUPPORT MOBILE INTEGRATED ACCESS AND BACKHAUL," the contents of which are incorporated herein by reference in their entireties.

FIELD OF THE DISCLOSURE

Aspects of the present disclosure generally relate to wireless communication, and more specifically, to techniques and apparatuses for signaling to support mobility in an integrated access and backhaul (IAB) network.

BACKGROUND

Wireless communication systems are widely deployed to provide various telecommunication services such as telephony, video, data, messaging, and broadcasts. Typical wireless communication systems may employ multiple-access technologies capable of supporting communication with multiple users by sharing available system resources (for example, bandwidth, transmit power, or a combination thereof). Examples of such multiple-access technologies include code division multiple access (CDMA) systems, time division multiple access (TDMA) systems, frequency-division multiple access (FDMA) systems, orthogonal frequency-division multiple access (OFDMA) systems, single-carrier frequency-division multiple access (SC-FDMA) systems, time division synchronous code division multiple access (TD-SCDMA) systems, and Long Term Evolution (LTE). LTE/LTE-Advanced is a set of enhancements to the Universal Mobile Telecommunications System (UMTS) mobile standard promulgated by the Third Generation Partnership Project (3GPP).

The above multiple access technologies have been adopted in various telecommunication standards to provide a common protocol that enables different user equipments (UEs) to communicate on a municipal, national, regional, and even global level. New Radio (NR), which may also be referred to as 5G, is a set of enhancements to the LTE mobile standard promulgated by the 3GPP. NR is designed to better support mobile broadband Internet access by improving spectral efficiency, lowering costs, improving services, making use of new spectrum, and better integrating with other open standards using orthogonal frequency division multiplexing (OFDM) with a cyclic prefix (CP) (CP-OFDM) on the downlink (DL), using CP-OFDM or SC-FDM (for example, also known as discrete Fourier transform spread OFDM (DFT-s-OFDM)) on the uplink (UL), as well as supporting beamforming, multiple-input multiple-output (MIMO) antenna technology, and carrier aggregation. However, as the demand for mobile broadband access continues to increase, there exists a need for further improvements in LTE and NR technologies. Preferably, these improvements are applicable to other multiple access technologies and the telecommunication standards that employ these technologies.

A radio access network may include a wireless backhaul network, sometimes referred to as an integrated access and backhaul (IAB) network. In an IAB network, at least one base station acts as an anchor base station (also referred to as an IAB donor) that communicates with a core network (via a wired backhaul link). The IAB network may include one or more non-anchor base stations (also referred to as IAB nodes), that may communicate directly with or indirectly with (for example, via one or more other non-anchor base stations) the anchor base station via one or more wireless backhaul links to form a backhaul path to the core network. In a typical IAB network, IAB nodes (for example, non-anchor base stations) are stationary (that is, non-moving). Conversely, in a mobile IAB network, some of the IAB nodes may be moved or capable of motion throughout some or all of the IAB network. For example, such IAB nodes (referred to herein as "mobile IAB nodes") may be characterized as being in, or being capable of being in, a state of motion (referred to herein as a "mobility state"). For example, a mobile IAB node may be installed on a vehicle (for example, a bus, a train, a taxi). In a mobile IAB network, there may be a mix of stationary and mobile IAB nodes. A mobility state of a given IAB node can impact operation of the mobile IAB network. For example, the performance of a number of IAB network-related operations may depend on the mobility states of mobile IAB nodes. Such IAB network-related operations may include, for example, IAB topology and resource management, local scheduling, beam management, beam tracking, synchronization tracking, positioning, quality of service (QoS) type support identification, access, and paging, among other examples. Thus, knowledge of the mobility state of a given IAB node may be desirable to facilitate the performance of the mobile IAB network.

SUMMARY

In some aspects, a method of wireless communication, performed by a wireless communication device, may include receiving mobility state information associated with an integrated access backhaul (IAB) node, wherein the mobility state information includes information associated with at least one of: a level of mobility of the IAB node, or a change in mobility of the IAB node; and performing an operation based at least in part on the mobility state information associated with the IAB node.

In some aspects, a method of wireless communication, performed by a wireless communication device, may include determining that mobility state information associated with an IAB node is to be transmitted, wherein the mobility state information includes information associated with at least one of: a level of mobility of the IAB node, or a change in mobility of the IAB node; and transmitting the mobility state information associated with the IAB node based at least in part on the determination that the mobility state information is to be transmitted.

In some aspects, a wireless communication device for wireless communication may include memory and one or more processors operatively coupled to the memory. The memory and the one or more processors may be configured to receive mobility state information associated with an IAB node, wherein the mobility state information includes information associated with at least one of: a level of mobility of the IAB node, or a change in mobility of the IAB node; and perform an operation based at least in part on the mobility state information associated with the IAB node.

In some aspects, a wireless communication device may include memory and one or more processors operatively coupled to the memory. The memory and the one or more processors may be configured to determine that mobility state information associated with an IAB node is to be transmitted, wherein the mobility state information includes information associated with at least one of: a level of mobility of the IAB node, or a change in mobility of the IAB node; and transmit the mobility state information associated with the IAB node based at least in part on the determination that the mobility state information is to be transmitted.

In some aspects, a non-transitory computer-readable medium may store one or more instructions for wireless communication. The one or more instructions, when executed by one or more processors of a wireless communication device, may cause the one or more processors to: receive mobility state information associated with an IAB node, wherein the mobility state information includes information associated with at least one of: a level of mobility of the IAB node, or a change in mobility of the IAB node; and perform an operation based at least in part on the mobility state information associated with the IAB node.

In some aspects, a non-transitory computer-readable medium may store one or more instructions for wireless communication. The one or more instructions, when executed by one or more processors of a wireless communication device, may cause the one or more processors to: determine that mobility state information associated with an IAB node is to be transmitted, wherein the mobility state information includes information associated with at least one of: a level of mobility of the IAB node, or a change in mobility of the IAB node; and transmit the mobility state information associated with the IAB node based at least in part on the determination that the mobility state information is to be transmitted.

In some aspects, an apparatus for wireless communication may include means for receiving mobility state information associated with an IAB node, wherein the mobility state information includes information associated with at least one of: a level of mobility of the IAB node, or a change in mobility of the IAB node; and means for performing an operation based at least in part on the mobility state information associated with the IAB node.

In some aspects, an apparatus for wireless communication may include means for determining that mobility state information associated with an IAB node is to be transmitted, wherein the mobility state information includes information associated with at least one of: a level of mobility of the IAB node, or a change in mobility of the IAB node; and means for transmitting the mobility state information associated with the IAB node based at least in part on the determination that the mobility state information is to be transmitted.

Aspects generally include a method, apparatus, system, computer program product, non-transitory computer-readable medium, user equipment, base station, wireless communication device, or processing system as substantially described with reference to and as illustrated by the drawings and specification.

The foregoing has outlined rather broadly the features and technical advantages of examples in accordance with the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages will be better understood from the following description when considered in connection with the accompanying figures. Each of the figures is provided for the purposes of illustration and description, and not as a definition of the limits of the claims.

BRIEF DESCRIPTION OF THE DRAWINGS

So that the above-recited features of the present disclosure can be understood in detail, a more particular description, briefly summarized above, may be had by reference to aspects, some of which are illustrated in the appended drawings. It is to be noted, however, that the appended drawings illustrate only some typical aspects of this disclosure and are therefore not to be considered limiting of its scope, for the description may admit to other equally effective aspects. The same reference numbers in different drawings may identify the same or similar elements.

DETAILED DESCRIPTION

Figure 1:
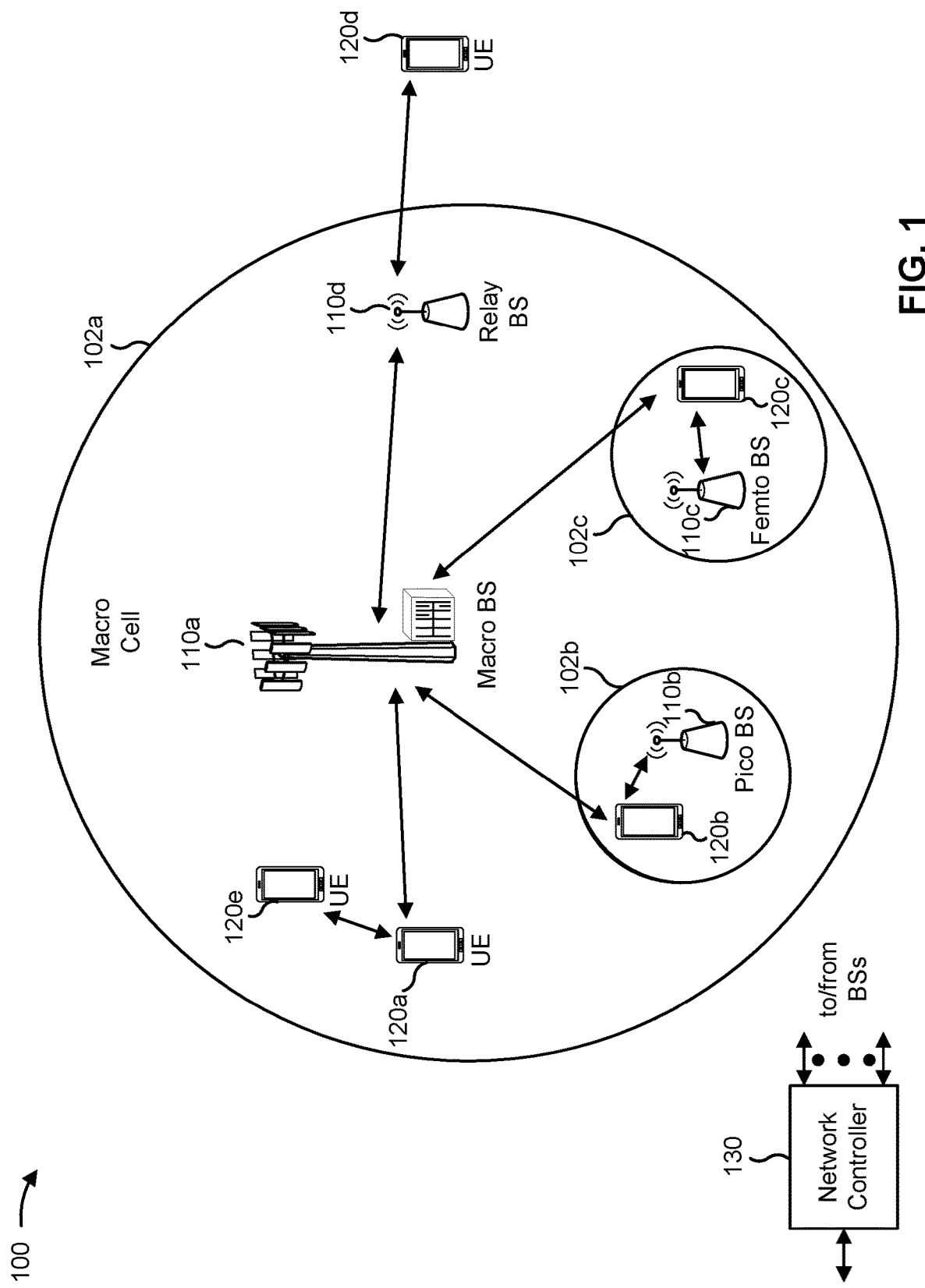
FIG. 1 is a block diagram illustrating an example wireless network in accordance with various aspects of the present disclosure.

Various aspects of the disclosure are described more fully hereinafter with reference to the accompanying drawings. This disclosure may, however, be embodied in many different forms and are not to be construed as limited to any specific structure or function presented throughout this disclosure. Rather, these aspects are provided so that this disclosure will be thorough and complete, and will fully convey the scope of the disclosure to those skilled in the art. Based on the teachings herein one skilled in the art may appreciate that the scope of the disclosure is intended to cover any aspect of the disclosure disclosed herein, whether implemented independently of or combined with any other aspect of the disclosure. For example, an apparatus may be implemented or a method may be practiced using any quantity of the aspects set forth herein. In addition, the scope of the disclosure is intended to cover such an apparatus or method which is practiced using other structure, functionality, or structure and functionality in addition to or other than the various aspects of the disclosure set forth herein. Any aspect of the disclosure disclosed herein may be embodied by one or more elements of a claim.

Several aspects of telecommunication systems will now be presented with reference to various apparatuses and techniques. These apparatuses and techniques will be described in the following detailed description and illustrated in the accompanying drawings by various blocks, modules, components, circuits, steps, processes, algorithms, or combinations thereof (collectively referred to as "elements"). These elements may be implemented using hardware, software, or combinations thereof. Whether such elements are implemented as hardware or software depends upon the particular application and design constraints imposed on the overall system.

It should be noted that while aspects may be described herein using terminology commonly associated with 3G or 4G wireless technologies, aspects of the present disclosure can be applied in other generation-based communication systems, such as 5G and later, including NR technologies.

In a typical IAB network, IAB nodes (for example, non-anchor base stations) are stationary (that is, non-moving). Conversely, in a mobile IAB network, some of the IAB nodes may be moved or capable of motion throughout some or all of the IAB network. For example, such IAB nodes (referred to herein as "mobile IAB nodes") may be characterized as being in, or being capable of being in, a state of motion (referred to herein as a "mobility state"). For example, an IAB node may be installed on a vehicle (for example, a bus, a train, a taxi) for providing network access to passengers in the vehicle. In a mobile IAB network, there may be a mix of stationary and mobile IAB nodes.

Information associated with a mobility state of an IAB node (herein referred to as mobility state information) may include, for example, information describing a level of mobility (for example, stationary, low-speed mobility, medium-speed mobility, high-speed mobility). As another example, the mobility state information may include information describing a change or a transition from one level of mobility to another (for example, the level of mobility of an IAB node may change or transition over time). For example, a mobile IAB node may transition to stationary (for example, from low-speed mobility), or may transition from one mobility class to another (for example, from medium-speed mobility to high-speed mobility).

The mobility state of a given IAB node can impact operation of the mobile IAB network. For example, the performance of a number of IAB network-related operations may depend on the mobility state of a mobile IAB node. Such IAB network-related operations may include, for example, IAB topology and resource management, local scheduling, beam management, beam tracking, synchronization tracking, positioning, QoS type support, access, and paging, among other examples. Thus, knowledge of the mobility state of a given IAB node may be desirable to facilitate efficient operation and acceptable performance of the mobile IAB network.

Some aspects described herein provide techniques and apparatuses for signaling to support mobility in an IAB network (also referred to herein as supporting "mobile IAB"). In some aspects, as described below, mobility state information (for example, including information associated with a level of mobility or a change of mobility of a given IAB node), may be received, transmitted, or requested by various nodes in the mobile IAB network (for example, an IAB donor, a non-donor IAB node, or a UE). For example, a wireless communication device, such as an IAB donor or an IAB node, may receive mobility state information associated with another IAB node, and perform an operation based at least in part on the mobility state information. The operation can include, for example, transmitting or relaying the mobility state information to another device in the IAB network, or can include an IAB network-related operation, such as an operation associated with IAB topology and resource management, local scheduling, beam management, beam tracking, synchronization tracking, positioning, QoS type support, access, or paging. In some aspects, signaling over different interfaces and at different protocol stack layers may be defined in order to support the transmission and reception of mobility state information, as described below.

Particular aspects of the subject matter described in this disclosure can be implemented to realize one or more of the following potential advantages. In some aspects, the described signaling to support mobile IAB enables the mobility state or other characteristic of the motion of a given IAB node to be taken into account by the IAB network. Taking the IAB node mobility into account can improve performance of an IAB network-related operation that may be impacted by the mobility of a given IAB node. Thus, signaling to support mobile IAB can improve overall performance of the IAB network and increase efficiency of the IAB network (in terms of, for example, resource utilization).

FIG. 1 is a block diagram illustrating an example wireless network in accordance with various aspects of the present disclosure. The wireless network may be a Long Term Evolution (LTE) network or some other wireless network, such as a 5G or NR network. The wireless network may include a quantity of base stations (BSs) 110 (shown as BS 110a, BS 110b, BS 110c, and BS 110d) and other network entities. A BS is an entity that communicates with user equipment (UE(s)) and may also be referred to as a Node B, an eNodeB, an eNB, a gNB, a NR BS, a 5G node B (NB), an access point (AP), a transmit receive point (TRP), or combinations thereof (these terms are used interchangeably herein). Each BS may provide communication coverage for a particular geographic area. In 3GPP, the term "cell" can refer to a coverage area of a BS or a BS subsystem serving this coverage area, depending on the context in which the term is used.

A BS may provide communication coverage for a macro cell, a pico cell, a femto cell, or another type of cell. A macro cell may cover a relatively large geographic area (for example, several kilometers in radius) and may allow unrestricted access by UEs with service subscription. A pico cell may cover a relatively small geographic area and may allow unrestricted access by UEs with service subscription. A femto cell may cover a relatively small geographic area (for example, a home) and may allow restricted access by UEs having association with the femto cell (for example, UEs in a closed subscriber group (CSG)). A BS for a macro cell may be referred to as a macro BS. A BS for a pico cell may be referred to as a pico BS. A BS for a femto cell may be referred to as a femto BS or a home BS. A BS may support one or multiple (for example, three) cells.

The wireless network may be a heterogeneous network that includes BSs of different types, for example, macro BSs, pico BSs, femto BSs, relay BSs, or combinations thereof. These different types of BSs may have different transmit power levels, different coverage areas, and different impacts on interference in the wireless network. For example, macro BSs may have a high transmit power level (for example, 5 to 40 watts) whereas pico BSs, femto BSs, and relay BSs may have lower transmit power levels (for example, 0.1 to 2 watts). In the example shown in FIG. 1, a BS 110a may be a macro BS for a macro cell 102a, a BS 110b may be a pico BS for a pico cell 102b, and a BS 110c may be a femto BS for a femto cell 102c. A network controller 130 may couple to the set of BSs 102a, 102b, 110a and 110b, and may provide coordination and control for these BSs. Network controller 130 may communicate with the BSs via a backhaul. The BSs may also communicate with one another, for example, directly or indirectly via a wireless or wireline backhaul.

In some aspects, a cell may not be stationary, rather, the geographic area of the cell may move in accordance with the location of a mobile BS. In some aspects, the BSs may be interconnected to one another or to one or more other BSs or network nodes (not shown) in the wireless network through various types of backhaul interfaces such as a direct physical connection, a virtual network, or combinations thereof using any suitable transport network.

The wireless network may also include relay stations. A relay station is an entity that can receive a transmission of data from an upstream station (for example, a BS or a UE) and send a transmission of the data to a downstream station (for example, a UE or a BS). A relay station may also be a UE that can relay transmissions for other UEs. In the example shown in FIG. 1, a relay station 110d may communicate with macro BS 110a and a UE 120d in order to facilitate communication between BS 110a and UE 120d. A relay station may also be referred to as a relay BS, a relay base station, a relay, or combinations thereof.

UEs 120 (for example, 120a, 120b, 120c) may be dispersed throughout the wireless network, and each UE may be stationary or mobile. A UE may also be referred to as an access terminal, a terminal, a mobile station, a subscriber unit, a station, or combinations thereof. A UE may be a cellular phone (for example, a smart phone), a personal digital assistant (PDA), a wireless modem, a wireless communication device, a handheld device, a laptop computer, a cordless phone, a wireless local loop (WLL) station, a tablet, a camera, a gaming device, a netbook, a smartbook, an ultrabook, a medical device or equipment, biometric sensors/devices, wearable devices (smart watches, smart clothing, smart glasses, smart wrist bands, smart jewelry (for example, smart ring, smart bracelet)), an entertainment device (for example, a music or video device, or a satellite radio), a vehicular component or sensor, smart meters/sensors, industrial manufacturing equipment, a global positioning system device, or any other suitable device that is configured to communicate via a wireless medium.

Some UEs may be considered machine-type communication (MTC) or evolved or enhanced machine-type communication (eMTC) UEs. MTC and eMTC UEs include, for example, robots, drones, remote devices, sensors, meters, monitors, location tags, or combinations thereof, that may communicate with a base station, another device (for example, remote device), or some other entity. A wireless node may provide, for example, connectivity for or to a network (for example, a wide area network such as Internet or a cellular network) via a wired or wireless communication link. Some UEs may be considered Internet-of-Things (IoT) devices, or may be implemented as NB-IoT (narrowband internet of things) devices. Some UEs may be considered a Customer Premises Equipment (CPE). UE 120 may be included inside a housing that houses components of UE 120, such as processor components, memory components, or combinations thereof.

In general, any quantity of wireless networks may be deployed in a given geographic area. Each wireless network may support a particular radio access technology (RAT) and may operate on one or more frequencies or frequency channels. A frequency may also be referred to as a carrier, or combinations thereof. Each frequency may support a single radio access technology (RAT) in a given geographic area in order to avoid interference between wireless networks of different RATs. In some cases, NR or 5G RAT networks may be deployed.

In some aspects, two or more UEs 120 (for example, shown as UE 120a and UE 120e) may communicate directly with one another using one or more sidelink channels (for example, without using a base station 110 as an intermediary). For example, the UEs 120 may communicate using peer-to-peer (P2P) communications, device-to-device (D2D) communications, a vehicle-to-everything (V2X) protocol (for example, which may include a vehicle-to-vehicle (V2V) protocol, a vehicle-to-infrastructure (V2I) protocol, or combinations thereof), a mesh network, or combinations thereof. In this case, the UE 120 may perform scheduling operations, resource selection operations, or other operations described elsewhere herein as being performed by the base station 110.

Figure 2:
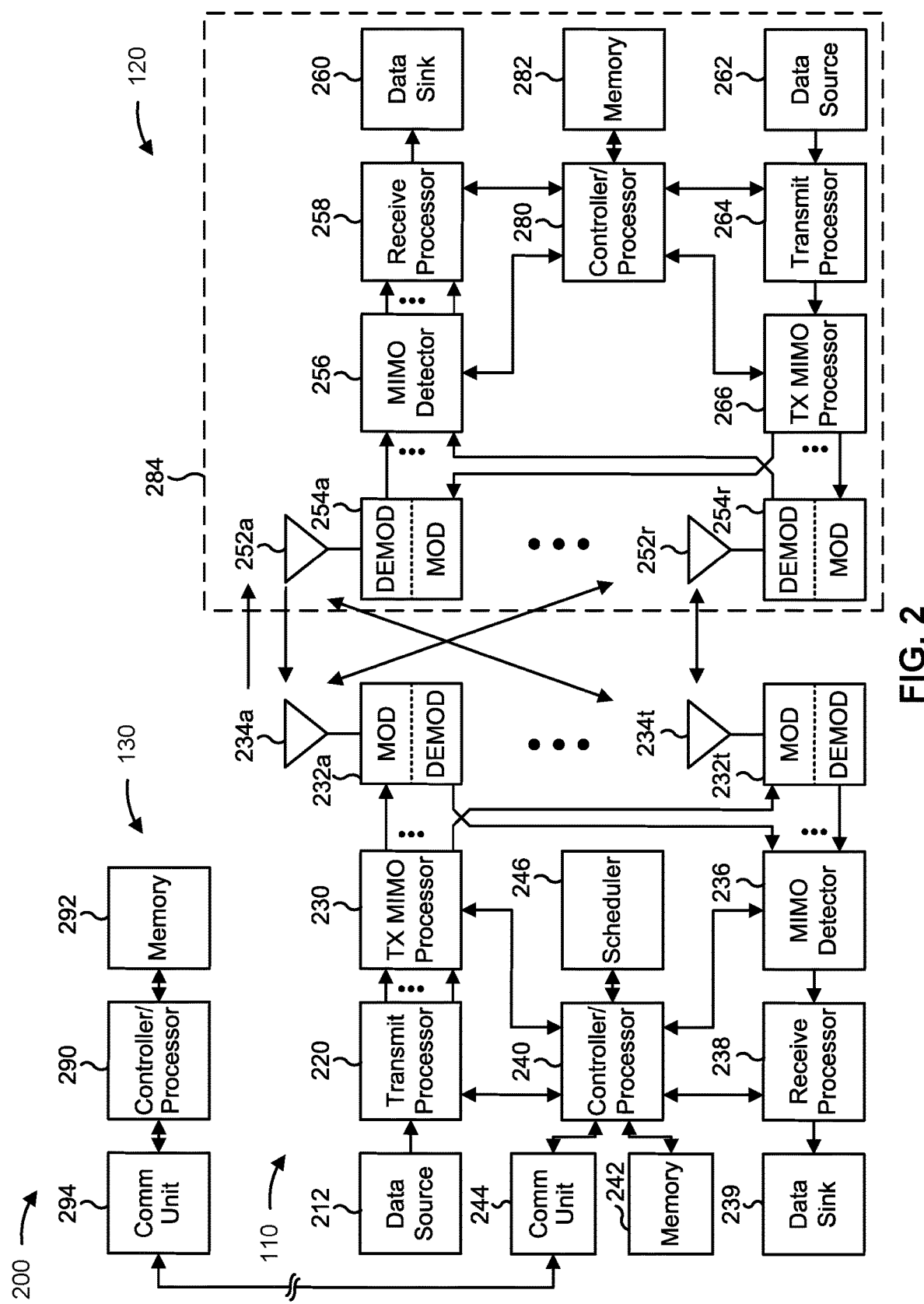
FIG. 2 is a block diagram illustrating an example base station (BS) in communication with a user equipment (UE) in a wireless network in accordance with various aspects of the present disclosure.

FIG. 2 is a block diagram illustrating an example base station (BS) in communication with a user equipment (UE) in a wireless network in accordance with various aspects of the present disclosure. Base station 110 may be equipped with T antennas 234a through 234t, and UE 120 may be equipped with R antennas 252a through 252r, where in general T≥1 and R≥1.

At base station 110, a transmit processor 220 may receive data from a data source 212 for one or more UEs, select one or more modulation and coding schemes (MCSs) for each UE based at least in part on channel quality indicators (CQIs) received from the UE, process (for example, encode) the data for each UE based at least in part on the MCS(s) selected for the UE, and provide data symbols for all UEs. Transmit processor 220 may also process system information (for example, for semi-static resource partitioning information (SRPI), or combinations thereof) and control information (for example, CQI requests, grants, upper layer signaling, or combinations thereof) and provide overhead symbols and control symbols. Transmit processor 220 may also generate reference symbols for reference signals (for example, the cell-specific reference signal (CRS)) and synchronization signals (for example, the primary synchronization signal (PSS) and secondary synchronization signal (SSS)). A transmit (TX) multiple-input multiple-output (MIMO) processor 230 may perform spatial processing (for example, precoding) on the data symbols, the control symbols, the overhead symbols, or the reference symbols, if applicable, and may provide T output symbol streams to T modulators (MODs) 232a through 232t. Each MOD 232 may process a respective output symbol stream (for example, for OFDM, or combinations thereof) to obtain an output sample stream. Each MOD 232 may further process (for example, convert to analog, amplify, filter, and upconvert) the output sample stream to obtain a downlink signal. T downlink signals from MODs 232a through 232t may be transmitted via T antennas 234a through 234t, respectively. In accordance with various aspects described in more detail below, the synchronization signals can be generated with location encoding to convey additional information.

At UE 120, antennas 252a through 252r may receive the downlink signals from base station 110 or other base stations and may provide received signals to R demodulators (DE-MODs) 254a through 254r, respectively. Each DEMOD 254 may condition (for example, filter, amplify, downconvert, and digitize) a received signal to obtain input samples. Each DEMOD 254 may further process the input samples (for example, for OFDM, or combinations thereof) to obtain received symbols. A MIMO detector 256 may obtain received symbols from all R DEMODs 254a through 254r, perform MIMO detection on the received symbols if applicable, and provide detected symbols. A receive processor 258 may process (for example, decode) the detected symbols, provide decoded data for UE 120 to a data sink 260, and provide decoded control information and system information to a controller/processor 280. A channel processor may determine a reference signal received power (RSRP), a received signal strength indicator (RSSI), a reference signal received quality (RSRQ), a channel quality indicator (CQI), or combinations thereof. In some aspects, one or more components of UE 120 may be included in a housing.

On the uplink, at UE 120, a transmit processor 264 may receive and process data from a data source 262 as well as control information (for example, for reports including RSRP, RSSI, RSRQ, CQI, or combinations thereof) from controller/processor 280. Transmit processor 264 may also generate reference symbols for one or more reference signals. The symbols from transmit processor 264 may be precoded by a TX MIMO processor 266 if applicable, further processed by MODs 254a through 254r (for example, for discrete Fourier transform spread orthogonal frequency division multiplexing (DFT-s-OFDM), orthogonal frequency division multiplexing (OFDM) with a cyclic prefix (CP) (CP-OFDM), or combinations thereof), and transmitted to base station 110. At base station 110, the uplink signals from UE 120 and other UEs may be received by antennas 234, processed by DEMODs 232, detected by a MIMO detector 236 if applicable, and further processed by a receive processor 238 to obtain decoded data and control information sent by UE 120. Receive processor 238 may provide the decoded data to a data sink 239 and the decoded control information to controller/processor 240. Base station 110 may include communication unit 244 and communicate to network controller 130 via communication unit 244. Network controller 130 may include communication unit 294, controller/processor 290, and memory 292.

Controller/processor 240 of base station 110, controller/processor 280 of UE 120, or any other component(s) of FIG. 2 may perform one or more techniques associated with signaling to support mobile integrated access and backhaul (IAB), as described in more detail elsewhere herein. For example, controller/processor 240 of base station 110, controller/processor 280 of UE 120, or any other component(s) of FIG. 2 may perform or direct operations of, for example, the process of FIG. 6, the process of FIG. 7, or other processes as described herein. Memories 242 and 282 may store data and program codes for base station 110 and UE 120, respectively. A scheduler 246 may schedule UEs for data transmission on the downlink or uplink.

In some aspects, a wireless communication device (for example, base station 110) may include means for receiving mobility state information associated with an IAB node, wherein the mobility state information includes information associated with at least one of: a level of mobility of the IAB node, or a change in mobility of the IAB node; means for performing an operation based at least in part on the mobility state information associated with the IAB node; or combinations thereof. In some aspects, such means may include one or more components of base station 110 described in connection with FIG. 2.

In some aspects, a wireless communication device (for example, base station 110) may include means for determining that mobility state information associated with an IAB node is to be transmitted, wherein the mobility state information includes information associated with at least one of: a level of mobility of the IAB node, or a change in mobility of the IAB node; means for transmitting the mobility state information associated with the IAB node based at least in part on the determination that the mobility state information is to be transmitted; or combinations thereof. In some aspects, such means may include one or more components of base station 110 described in connection with FIG. 2.

Figure 3:
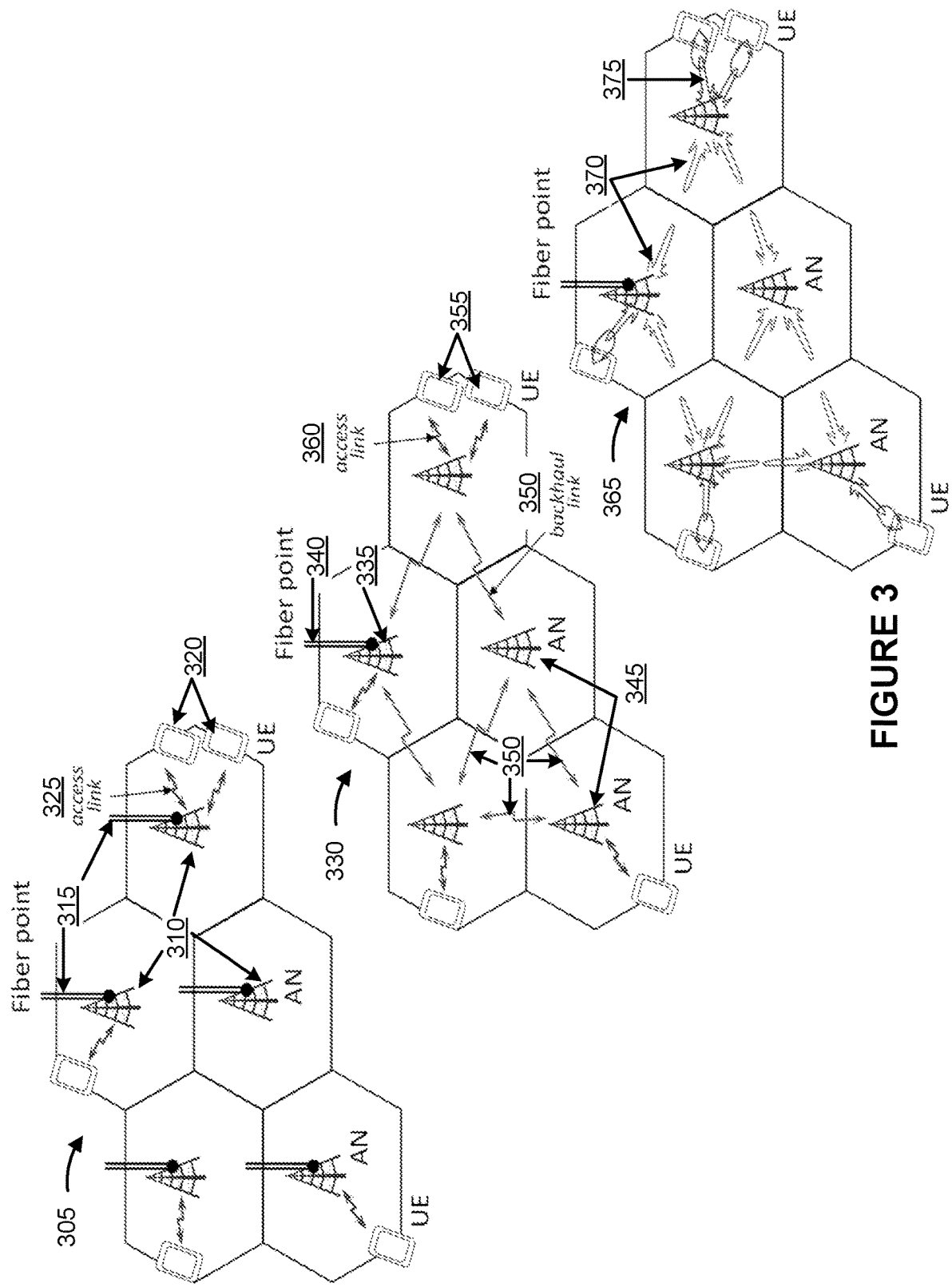
FIG. 3 is a diagram illustrating examples of radio access networks, in accordance with various aspects of the present disclosure.

FIG. 3 is a diagram illustrating examples of radio access networks, in accordance with various aspects of the disclosure. As shown by reference number 305, a traditional (for example, 3G, 4G, LTE, 5G, NR) radio access network may include multiple base stations 310 (for example, access nodes (AN)), where each base station 310 communicates with a core network via a wired backhaul link 315, such as a fiber connection. A base station 310 may communicate with a UE 320 via a wireless access link 325. In some aspects, a base station 310 shown in FIG. 3 may correspond to a base station 110 shown in FIG. 1. Similarly, a UE 320 shown in FIG. 3 may correspond to a UE 120 shown in FIG. 1.

As shown by reference number 330, a radio access network may include a wireless backhaul network, sometimes referred to as an integrated access and backhaul (IAB) network. In an IAB network, at least one base station is an anchor base station 335 that communicates with a core network via a wired backhaul link 340, such as a fiber connection. An anchor base station 335 may also be referred to as an IAB donor. The IAB network may include one or more non-anchor base stations 345, sometimes referred to as relay base stations or simply as IAB nodes. The non-anchor base station 345 may communicate directly or indirectly (for example, via one or more other non-anchor base stations 345) with the anchor base station 335 via one or more wireless backhaul links 350 to form a backhaul path to the core network for carrying backhaul traffic. That is, in some aspects, an IAB network may be a multi-hop network, also referred to herein as a multi-hop wireless backhaul. In some aspects, each node of an IAB network may use the same radio access technology (for example, 5G/NR). Anchor base station(s) 335 or non-anchor base station(s) 345 may communicate with one or more UEs 355 via wireless access links 360 carrying access traffic. In some aspects, nodes of the IAB network may share resources for access links and backhaul links, such as time resources, frequency resources, or spatial resources. In some aspects, an anchor base station 335 or a non-anchor base station 345 shown in FIG. 3 may correspond to a base station 110 shown in FIG. 1. Similarly, a UE 355 shown in FIG. 3 may correspond to a UE 120 shown in FIG. 1.

As shown by reference number 365, in some aspects, a radio access network that includes an IAB network may utilize millimeter wave technology or directional communications (for example, beamforming, precoding) for communications between base stations or UEs (for example, between two base stations, between two UEs, or between a base station and a UE). For example, wireless backhaul links 370 between base stations may use millimeter waves to carry information that may be directed toward a target base station using precoding or beamforming. Similarly, the wireless access links 375 between a UE and a base station may use millimeter waves that may be directed toward a target wireless node (for example, a UE or a base station). Using beamforming for directional transmission may reduce inter-link interference.

In some aspects, an IAB donor includes a central unit (CU) that configures IAB nodes that access a core network via the IAB donor, and a distributed unit (DU) that schedules and communicates with child nodes of the IAB donor. In some aspects, an IAB node includes a mobile termination component (MT) that is scheduled by and that communicates with a DU of a parent node, and a DU that schedules and communicates with child nodes of the IAB node. A DU of an IAB node may perform functions described in connection with a base station for that IAB node, and an MT of an IAB node may perform functions described in connection with a UE for that IAB node.

Figure 4:
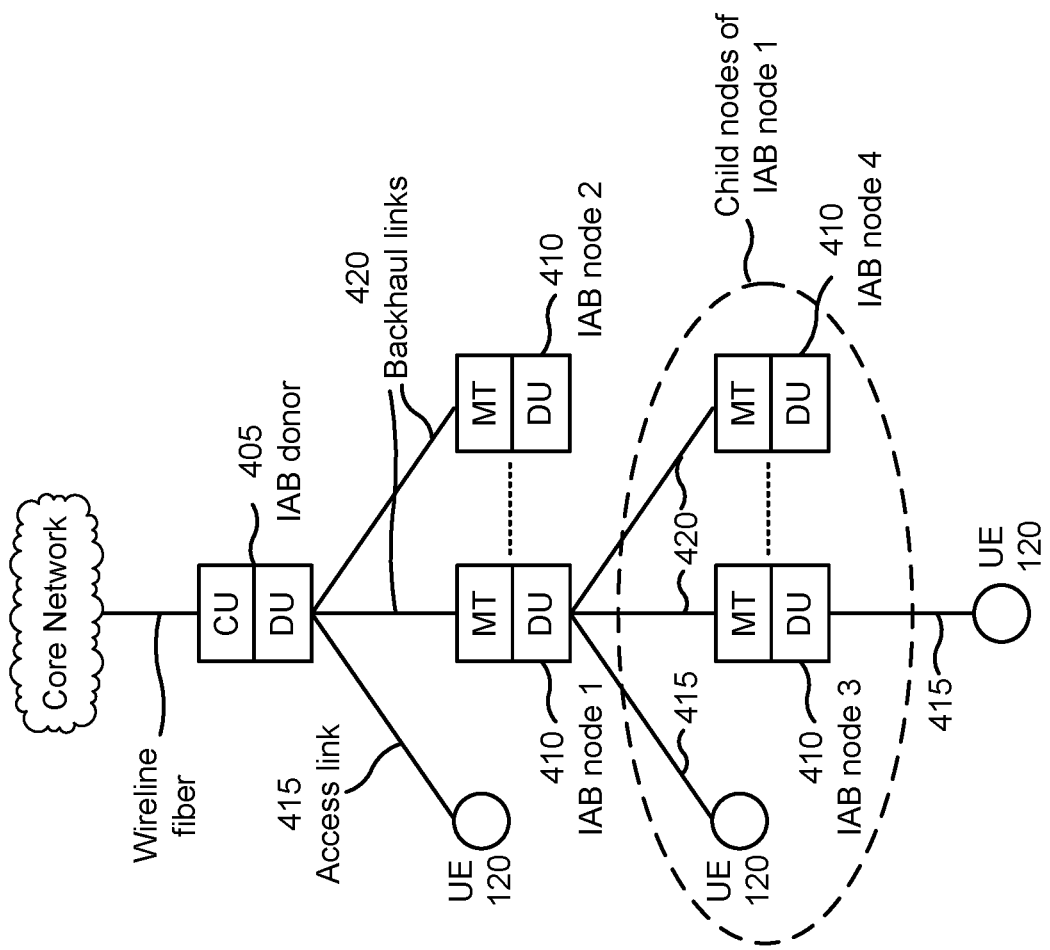
FIG. 4 is a diagram illustrating an example of an integrated access and backhaul (IAB) network architecture in accordance with various aspects of the disclosure.

FIG. 4 is a diagram illustrating an example of an IAB network architecture, in accordance with various aspects of the disclosure. As shown in FIG. 4, an IAB network may include an IAB donor 405 that connects to a core network via a wired connection (for example, as a wireline fiber). For example, an Ng interface of an IAB donor 405 may terminate at a core network. Additionally, or alternatively, an IAB donor 405 may connect to one or more devices of the core network that provide a core access and mobility management function (AMF). In some aspects, an IAB donor 405 may include a base station 110, such as an anchor base station, as described above in connection with FIG. 3. As shown, an IAB donor 405 may include a CU, which may perform ANC functions or AMF functions. The CU may configure a DU of the IAB donor 405 or may configure one or more IAB nodes 410 (for example, an MT or a DU of an IAB node 410) that connect to the core network via the IAB donor 405. Thus, a CU of an IAB donor 405 may control or configure the entire IAB network that connects to the core network via the IAB donor 405, such as by using control messages or configuration messages (for example, a radio resource control (RRC) configuration message or an F1 application protocol (F1AP) message).

As described above, the IAB network may include non-donor IAB nodes 410 (shown as IAB nodes 1 through 4) that connect to the core network via the IAB donor 405. As shown, an IAB node 410 may include an MT and a DU. The MT of an IAB node 410 (for example, a child node) may be controlled or scheduled by another IAB node 410 (for example, a parent node) or by an IAB donor 405. The DU of an IAB node 410 (for example, a parent node) may control or schedule other IAB nodes 410 (for example, child nodes of the parent node) or UEs 120. Thus, a DU may be referred to as a scheduling node or a scheduling component, and an MT may be referred to as a scheduled node or a scheduled component. In some aspects, an IAB donor 405 may include a DU and not an MT. That is, the CU of an IAB donor 405 may configure, control, or schedule communications of all IAB nodes 410 or UEs 120. As another example, a UE 120 may include only an MT and not a DU. That is, communications of a UE 120 may be entirely controlled or scheduled by an IAB donor 405 or an IAB node 410 (for example, a parent node of the UE 120).

When a first node controls or schedules communications for a second node (for example, when the first node provides DU functions for the second node's MT), the first node may be referred to as a parent node of the second node, and the second node may be referred to as a child node of the first node. Likewise, a child node of the second node may be referred to as a grandchild node of the first node. Thus, a DU of a parent node may control or schedule communications for child nodes of the parent node as well as, in some instances, grandchild nodes of the parent node. A parent node may be an IAB donor 405 or an IAB node 410 that has at least one child node, while a child node may be a UE 120 or an IAB node 410 that has at least one parent node. Communications of an MT of a child node may be controlled or scheduled by a parent node of the child node.

As further shown in FIG. 4, a direct link between a UE 120 and an IAB donor 405, or between a UE 120 and an IAB node 410, may be referred to as an access link 415. Each access link 415 may be a direct wireless access link between the respective devices that ultimately provides the UE 120 with access to a core network via the IAB donor 405 (potentially via one or more backhaul links between an IAB node 410 and the IAB donor 405, as described in more detail below).

As further shown in FIG. 4, a wireless link between an IAB donor 405 and an IAB node 410, or between two IAB nodes 410, may be referred to as a backhaul link 420. Each backhaul link 420 may be a wireless backhaul link that provides an IAB node 410 with radio access to a core network via the IAB donor 405, and potentially via one or more other intermediate IAB nodes 410 and associated backhaul links 420. In some aspects, a backhaul link 420 may be a primary backhaul link or a secondary backhaul link (for example, a backup backhaul link to the same parent node or to a different parent node). In some aspects, a secondary backhaul link may be used if a primary backhaul link fails, becomes congested, or becomes overloaded. In an IAB network, network resources for wireless communications (for example, time resources, frequency resources, spatial resources) may be shared between access links 415 and backhaul links 420.

As described above, in a typical IAB network, IAB nodes (for example, non-anchor base stations) are stationary (that is, non-moving). Conversely, in a mobile IAB network, some of the IAB nodes may be moved or capable of motion throughout some or all of the IAB network. For example, such IAB nodes (referred to herein as "mobile IAB nodes") may be characterized as being in, or being capable of being in, a state of motion (referred to herein as a "mobility state"). For example, an IAB node may be installed on a vehicle (for example, a bus, a train, a taxi). In a mobile IAB network, there may be a mix of stationary and mobile IAB nodes. In some cases, the mobile IAB nodes may be constrained to be "leaf" nodes in the mobile IAB network. For example, a mobile IAB node may be permitted to be only a last-hop IAB node, that is, an IAB node that is not permitted to have any child IAB nodes. In some other cases, a mobile IAB node also may be permitted to have another IAB node as a child node.

In some examples, a mobile IAB node may provide an independently moving cell site. In such a case, a moving cell site (for example, a vehicle, such as a bus, a train, or a taxi) can serve surrounding UEs (for example, in an urban area). Depending on various factors, such as the type of vehicle, a mobile IAB node may move relatively randomly, at relatively low speeds (for example, urban city speeds), or over a relatively large distance. In such examples, the mobility of a given UE that is not carried in or on the vehicle is independent of the mobility of the IAB node (that is, the movement of the UE is not predictable based on the movement of the mobile IAB node), but may also be at relatively low speeds (a speed similar to the mobile IAB node).

In some other examples, a mobile IAB node may provide a jointly-moving cell site (for example, a high-speed train). In such a case, a mobile IAB node may be mounted in or on the moving cell site (for example, on top of a high-speed train) in order to serve UEs on or in the moving cell site (for example, UEs inside the high-speed train). Here, the motion of the mobile IAB node may be predictable, at relatively high speeds, and extend over a large distance. In this use case, UEs on or in the moving cell site move jointly with the mobile IAB node (that is, UE movement is predictable based on the movement of the mobile IAB node).

In some other examples, a mobile IAB node may facilitate a platoon when, for example, a loose group of UEs is generally moving together. In such a case, a single IAB node may provide network connectivity for multiple nearby UEs. For example, a mobile IAB node mounted on a first vehicle driving on a freeway may provide network connectivity for UEs in the first vehicle as well as for UEs in other vehicles proximal to the first vehicle, which may be driving on the freeway in the same direction and at a similar speed. In such cases, the mobile IAB node connects to the network, while other vehicles might house respective child nodes. Here, the mobile IAB node moves with local predictability, at a relatively constant speed, and over a relatively large distance. Further, the UEs move jointly with the mobile IAB node.

Information associated with a mobility state of an IAB node (herein referred to as mobility state information) may include, for example, information describing a level of mobility (for example, stationary, low-speed mobility, medium-speed mobility, high-speed mobility). As another example, the mobility state information may include information describing a change or a transition from one level of mobility to another (for example, the level of mobility of an IAB node may change or transition over time). For example, a mobile IAB node may transition to stationary (for example, from low-speed mobility), or may transition from one mobility class to another (for example, from medium-speed mobility to high-speed mobility). In some instances, there may be a timer associated with such a transition (for example, an IAB node may transition from one state to another within an indicated window of time).

The mobility state of a given IAB node can impact operation of the mobile IAB network. For example, the performance of a number of IAB network-related operations may depend on the mobility state of a mobile IAB node. Such IAB network-related operations may include, for example, IAB topology and resource management, local scheduling, beam management, beam tracking, synchronization tracking, positioning, QoS type support, access, and paging, among other examples. Thus, knowledge of the mobility state of a given IAB node may be desirable to facilitate efficient and acceptable performance of the mobile IAB network.

Some aspects described herein provide techniques and apparatuses for signaling to support mobility in an IAB network (also referred to herein as supporting "mobile IAB"). In some aspects, as described below, mobility state information (for example, including information associated with a level of mobility or a change of mobility of a given IAB node), may be received, transmitted, or requested by various nodes in the mobile IAB network (for example, an IAB donor, a non-donor IAB node, or a UE). For example, a wireless communication device, such as an IAB donor or an IAB node, may receive mobility state information associated with another IAB node, and perform an operation based at least in part on the mobility state information. The operation can include, for example, transmitting or relaying the mobility state information to another device in the IAB network, or can include an IAB network-related operation, such as an operation associated with IAB topology and resource management, local scheduling, beam management, beam tracking, synchronization tracking, positioning, QoS type support, access, or paging. In some aspects, signaling over different interfaces and at different protocol stack layers may be defined in order to support the transmission and reception of mobility state information, as described below.

Particular aspects of the subject matter described in this disclosure can be implemented to realize one or more of the following potential advantages. In some aspects, the described signaling to support mobile IAB enables the mobility state or other characteristic of the motion of a given IAB node to be taken into account by the IAB network. Taking the IAB node mobility into account can improve performance of an IAB network-related operation that may be impacted by the mobility of a given IAB node. Thus, signaling to support mobile IAB can improve overall performance of the IAB network and increase efficiency of the IAB network (in terms of, for example, resource utilization).

Figure 5:
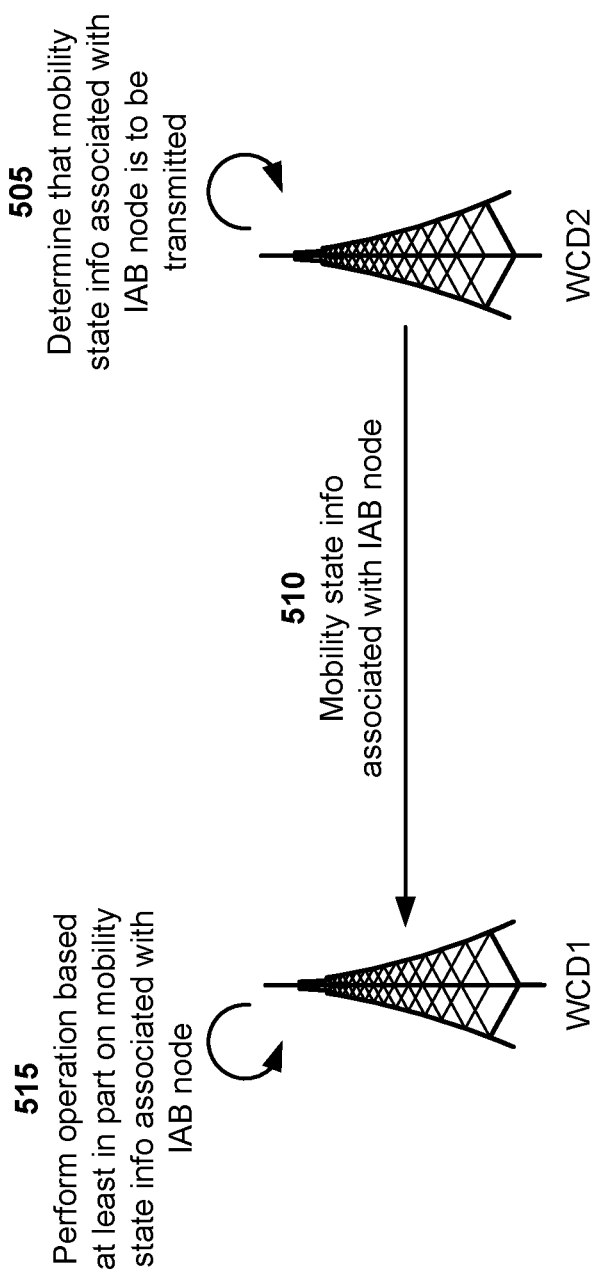
FIG. 5 is a diagram illustrating an example of signaling for support of mobile IAB networking in accordance with various aspects of the present disclosure.

FIG. 5 is a diagram illustrating an example associated with signaling to support mobile IAB networking in accordance with various aspects of the present disclosure. In FIG. 5, a first wireless communication device (identified as WCD1) and a second wireless communication device (identified as WCD2) are nodes in a mobile IAB network. In some aspects, the first wireless communication device may be an IAB node such as a first base station 110, a first anchor base station 335, a first non-anchor base station 345, a first IAB donor 405, or a first IAB node 410. Similarly, the second wireless communication device may be another IAB node such as a second base station 110, a second anchor base station 335, a second non-anchor base station 345, a second IAB donor 405, or a second IAB node 410.

As shown in FIG. 5, in a first operation 505, the second wireless communication device may determine that mobility state information associated with an IAB node (for example, an IAB node 405) is to be transmitted (for example, transmitted by the second wireless communication device for reception by the first wireless communication device). For example, the second wireless communication device may receive a request or an indication to provide, to the first wireless communication device, mobility state information associated with the IAB node. In some aspects, the determination may be that mobility state information associated with the second wireless communication device is to be transmitted (that is, the determination may be that the second wireless communication device is to transmit mobility state information associated with itself). In this scenario, the second wireless communication device is the IAB node referenced in the first operation 505. In some aspects, the determination may be that mobility state information associated with a third wireless communication device is to be transmitted (that is, the determination may be that the second wireless communication device is to transmit mobility state information associated with the third wireless communication device after, for example, receiving the mobility state information from the third wireless communication device). In this scenario, the third wireless communication device is the IAB node referenced in the first operation 505. Thus, in some aspects, the IAB node with which the mobility state information is associated may be the IAB node itself, a parent-node of the IAB node, a child node of the IAB node, or another IAB node detected by the IAB node.

In some aspects, mobility information associated with an IAB node may include information that indicates the mobility state of the IAB node. For example, the mobility state information may include information associated with a level or state of mobility of the IAB node, such as information indicating whether the IAB node is stationary, has low-speed mobility (for example, is moving at a speed that is less than or equal to a first threshold), has medium-speed mobility (for example, is moving at a speed that is greater than the first threshold but is less than or equal to a second threshold), or has high-speed mobility (for example, is moving at a speed that is greater than the second threshold). As another example, the mobility state information may include information associated with a change (that is, a transition) in mobility of the IAB node, such as information indicating a transition from one mobility state to another, such as from the stationary state to the low-speed state. In some aspects, the mobility state information may include information indicating a time at which the transition has taken or is to take place. As another example, the mobility state information may include a measurement report associated with the IAB node, such as a radio resource measurement (RRM) measurement report. As yet another example, the mobility state information may include information indicating whether the IAB node is capable of motion or being moved (for example, an indication of whether the IAB node is a non-mobile IAB node). As described above, the mobility state of a given IAB node can impact operation of the mobile IAB network and, therefore, knowledge of the mobility state may be needed in order to facilitate efficient and acceptable performance of the mobile IAB network.

In some aspects, the determination that the mobility state information is to be transmitted may be based at least in part on an explicit request for the mobility state information associated with the IAB node. For example, the first wireless communication device may request the mobility state information associated with the IAB node by sending a request to the second wireless communication device. Here, the second wireless communication device may receive the request and may transmit the mobility state information based at least in part on the request (for example, after determining the mobility state information or receiving the mobility state information from the IAB node).

In some aspects, the determination that the mobility state information that is to be transmitted may be based at least in part on a reporting configuration for transmitting the mobility state information associated with the IAB node. For example, the first wireless communication device may provide, to the second wireless communication device, a reporting configuration for transmitting the mobility state information associated with the IAB node. In some aspects, the reporting configuration may indicate periodic reporting of the mobility state information (for example, to cause the second wireless communication device to transmit the mobility state information automatically on a periodic basis). In some aspects, the reporting configuration may indicate aperiodic reporting of the mobility state information (for example, to cause the second wireless communication device to transmit the mobility state information dynamically on an aperiodic basis, for example, when requested by the first wireless communication device). In some aspects, the reporting configuration may indicate event-triggered reporting of the mobility state information (for example, to cause the second wireless communication device to transmit the mobility state information based at least in part on detecting an event indicated by the reporting configuration). Here, the second wireless communication device may receive the reporting configuration and provide the mobility state information based at least in part on the reporting configuration (for example, periodically, aperiodically, or based at least in part on detecting an event).

As further shown in FIG. 5, in a second operation 510, the second wireless communication device may transmit the mobility state information associated with the IAB node, and the first wireless communication device may receive the mobility state information associated with the IAB node. In some aspects, the second wireless communication device may transmit, and the first wireless communication device may receive, the mobility state information in an RRC message, downlink control information (DCI), a layer 1 reference signal, a medium access control (MAC) control element, a master information block (MIB), a random access channel (RACH) message, a system information block (SIB), a handover request message, a secondary node (SN) addition request message, or another type of communication. In some aspects, when transmitting the mobility state information, the second wireless communication device may broadcast the mobility state information for reception by the first wireless communication device or one or more other wireless communication devices (for example, one or more other IAB nodes 410). In some aspects, the reporting configuration may indicate a configuration for broadcasting the mobility state information.

In some aspects, the second wireless communication device may transmit at least a portion of the mobility state information in a communication that explicitly indicates the mobility state information. Thus, in some aspects, the first wireless communication device may receive the mobility state information in a communication that includes or otherwise explicitly indicates the mobility state information. Additionally or alternatively, in some aspects, the second wireless communication device may transmit at least a portion of the mobility state information in a communication that implicitly indicates the mobility state information. For example, at least a portion of the mobility state information may be implicitly indicated based at least in part on a set of resources over which a signal is transmitted. Thus, in some aspects, the first wireless communication device may receive the mobility state information in a communication that implicitly indicates the mobility state information based on which resources were selected for transmission of the signal.

As further shown in FIG. 5, in a third operation 515, the first wireless communication device may perform an operation based at least in part on the mobility state information associated with the IAB node. For example, the first wireless communication device may perform an operation associated with IAB topology and resource management, local scheduling, beam management, beam tracking, synchronization tracking, positioning, QoS type support, an access procedure, paging, or another type of IAB network-related operation. As another example, the first wireless communication device may provide the mobility state information associated with the IAB node (that is, the operation may include providing the mobility state information associated with the IAB node). In some aspects, the first wireless communication device may transmit the indication of the mobility state information to, for example, an IAB donor (for example, an IAB donor 405) for provision to the CU of the IAB donor, or to another IAB node (that is, an IAB node 410 other than that with which the mobility state information is associated) for provision to a DU or an MT of the other IAB node. In one example, the first wireless communication device may be a parent node (for example, a first IAB node 410) and the second wireless communication device may be a child node (for example, a second IAB node 410). Here, the parent node may be provided with mobility state information associated with the child IAB node. The mobility state information can be used for various purposes, such as resource management, local scheduling, beam management, beam tracking, synchronization tracking, positioning, QoS type support, paging, among other examples. For such purposes, the mobility state information should be provided to a DU of the parent node. In some examples, a DU of the child node may broadcast the mobility state information for reception by the DU of the parent node. In some other examples, an MT of the child node may provide the mobility state information directly to the DU of the parent node (for example, over a Uu interface). In some other examples, a CU of an IAB donor (for example, an IAB donor 405) may provide the mobility state information to the DU of the parent node. As a particular example, an MT of the child node may provide (for example via an RRC message) the mobility state information to a CU of the IAB donor, and the CU of the IAB donor may provide (for example, via an F1-AP message) the mobility state information to the DU of the parent node. As another particular example, the DU of the child node may provide (for example, via an F1-AP message) the mobility state information to the CU of the IAB donor, and the CU of the IAB donor may provide (for example, via an F1-AP message) the mobility state information to the DU of the parent node.

In another example, the first wireless communication device may be a child node and the second wireless communication device may be a parent node of the child node. Here, the child node may be provided with mobility state associated with the parent node. The mobility state information can be used for various purposes, such as beam management, beam tracking, synchronization tracking, positioning, QoS type support, an access procedure, among other examples. For such purposes, the mobility state information should be provided to a DU or an MT of the child node. In some examples, a DU of the parent node may broadcast the mobility state information for reception by the DU or the MT of the child node. In some other examples, a DU of the parent node may provide the mobility state information directly to the MT of the child node (for example, over a Uu interface). In some other examples, a CU of an IAB donor may provide the mobility state information to the child node. As a particular example, an MT of the parent node may provide (for example via an RRC message) the mobility state information to a CU of the IAB donor, and the CU of the IAB donor may provide (for example, via an F1-AP message) the mobility state information to the DU of the parent node or may provide (for example, via an RRC message) the mobility state information to the MT of the child node. As another particular example, the DU of the parent node may provide (for example, via an F1-AP message) the mobility state information to the CU of the IAB donor, and the CU of the IAB donor may provide (for example, via an F1-AP message) the mobility state information to the DU of the parent node or may provide (for example, via an RRC message) the mobility state information to the MT of the child node.

In another example, the first wireless communication device may be an IAB donor and the second wireless communication device may be an IAB node. Here, a CU of the IAB donor may be provided with the mobility state of the IAB node. The mobility state information can be used for various, such as IAB topology and resource management, beam management, synchronization, positioning, QoS type support, an access procedure, paging, or another type of IAB network-related operation. Additionally or alternatively, the CU may to provide or relay the mobility state information to a third wireless communication device (for example, another IAB node or network entity, such as another IAB node 410). In some examples, an MT of the IAB node may provide the mobility state information to the CU of the IAB donor (for example, via an RRC message). In some other examples, a DU of the IAB node may provide the mobility state information to the CU of the IAB donor (for example, via an F1-AP message).

As described above, in some examples, the first wireless communication device may be an IAB donor (for example, an IAB donor 405) and the mobility state information may be received by a CU of the IAB donor. Here, the second wireless communication device may be the IAB node (that is, the IAB node with which the mobility state information is associated) and a DU or an MT of the second wireless communication device may transmit the mobility state information to the CU of the IAB donor. Alternatively, the second wireless communication device may be another IAB node (that is, an IAB node 410 other than the IAB node with which the mobility state information is associated), and a DU or an MT of the second wireless communication device may transmit the mobility state information to the CU of the IAB donor. In some aspects, when the mobility state information is transmitted and received by a DU and a CU, respectively, the mobility state information may be communicated via an F1-AP interface. In some aspects, when the mobility state information is transmitted and received by an MT and a CU, respectively, the mobility state information may be communicated via a Uu interface (for example, in an RRC message, such as in a SIB).

As another alternative, when the first wireless communication device is an IAB donor, the second wireless communication device may be another IAB donor (for example, another IAB donor 405). Here, a CU of the second wireless communication device may transmit the mobility state information to the CU of the first wireless communication device. In some aspects, when the mobility state information is transmitted and received by a CU and a CU, respectively, the mobility state information may be communicated via an X2/Xn interface. In some aspects, CU-CU communication of the mobility state information may be used for inter-donor parent-node migration or dual connectivity (DC) via multiple IAB donors. In some such examples, the mobility state information may be included in a handover request message transmitted by the serving IAB donor to the target IAB donor. In some other examples, the mobility state information can be included in an SN addition request message associated with, for example, NR DC, multi-RAT (MR) DC, or evolved-universal terrestrial radio access-NR (EN) DC. Notably, in some cases, the IAB donor may reject an RRC setup message or an X2/Xn handover request or an SN addition request with, for example, the cause "mobility state not supported."

In some aspects, the first wireless communication device may not be an IAB donor, but may be another IAB node (for example, a first IAB node 410), and the mobility state information may be received by a DU of the first wireless communication device. Here, the second wireless communication device may be the IAB node with which the mobility state information is associated, and an MT of the second wireless communication device may transmit the mobility state information to the DU of the first wireless communication device. Alternatively, the second wireless communication device may be a different IAB node than the IAB node with which the mobility state information is associated, and an MT of the second wireless communication device may transmit the mobility state information to the DU of the first wireless communication device. In some aspects, when the mobility state information is transmitted and received by an MT and a DU, respectively, the mobility state information may be communicated via a Uu interface (for example, in DCI, a layer 1 reference signal, a MAC control element, a MIB, a SIB1, uplink control information (UCI)).

Figure 6:
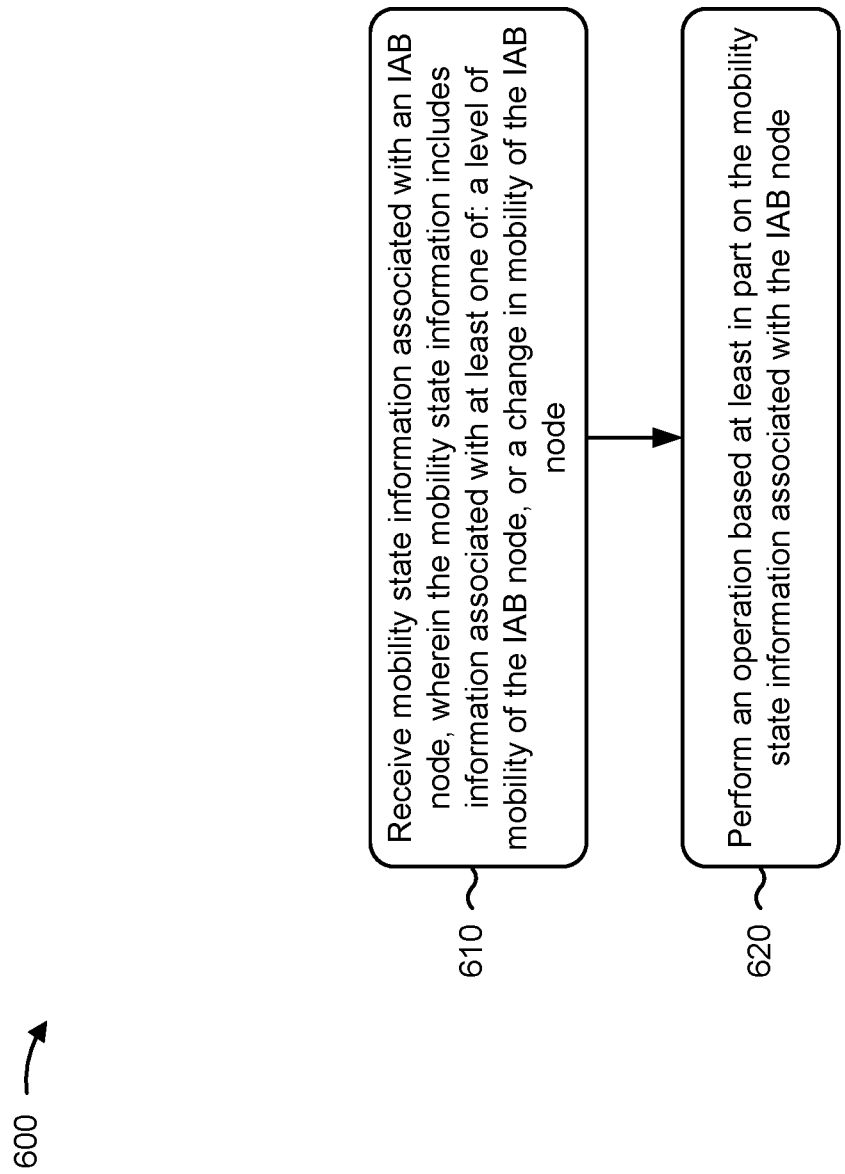
FIG. 6 is a diagram illustrating an example process performed by a wireless communication device that supports mobile IAB in accordance with various aspects of the present disclosure.

FIG. 6 is a diagram illustrating an example process 600 performed, for example, by a wireless communication device, in accordance with various aspects of the present disclosure. The process shown in FIG. 6 is an example where a wireless communication device (for example, base station 110, anchor base station 335, non-anchor base station 345, IAB donor 405, IAB node 410) performs operations associated with signaling to support mobile IAB.

As shown in FIG. 6, in some aspects, the example process may include receiving mobility state information associated with an IAB node, wherein the mobility state information includes information associated with at least one of a level of mobility of the IAB node, or a change in mobility of the IAB node (block 610). For example, the wireless communication device (for example, using transmit processor 220, receive processor 238, controller/processor 240, memory 242) may receive mobility state information associated with an IAB node (for example, non-anchor base station 345 or IAB node 410), wherein the mobility state information includes information associated with at least one of a level of mobility of the IAB node or a change in mobility of the IAB node, as described above.

As further shown in FIG. 6, in some aspects, the example process may include performing an operation based at least in part on the mobility state information associated with the IAB node (block 620). For example, the wireless communication device (for example, using transmit processor 220, receive processor 238, controller/processor 240, memory 242) may perform an operation based at least in part on the mobility state information associated with the IAB node, as described above.

The process shown in FIG. 6 may include additional aspects, such as any single aspect or any combination of aspects described below or in connection with one or more other processes described elsewhere herein.

In a first additional aspect, the process 600 may further include requesting the mobility state information associated with the IAB node, and the mobility state information is received based at least in part on requesting the mobility state information.

In a second additional aspect, alone or in combination with the first aspect, the process 600 may further include providing a reporting configuration for transmitting the mobility state information associated with the IAB node, and the mobility state information is received based at least in part on the reporting configuration.

In a third additional aspect, alone or in combination with one or more of the first and second aspects, the reporting configuration indicates at least one of: periodic reporting of the mobility state information, aperiodic reporting of the mobility state information, or event-triggered reporting of the mobility state information.

In a fourth additional aspect, alone or in combination with one or more of the first through third aspects, the operation includes providing the mobility state information associated with the IAB node to at least one of: a CU of an IAB donor (for example, IAB donor 405), a DU of another IAB node (for example, another IAB node 410), or an MT of the other IAB node.

In a fifth additional aspect, alone or in combination with one or more of the first through fourth aspects, the wireless communication device is a CU of an IAB donor (for example, IAB donor 405).

In a sixth additional aspect, alone or in combination with one or more of the first through fifth aspects, the mobility state information is received from a DU of the IAB node.

In a seventh additional aspect, alone or in combination with one or more of the first through sixth aspects, the IAB node is a first IAB node, and the mobility state information is received from a DU of a second IAB node (for example, a second IAB node 410).

In an eighth additional aspect, alone or in combination with one or more of the first through seventh aspects, the mobility state information is received from an MT of the IAB node.

In a ninth additional aspect, alone or in combination with one or more of the first through eighth aspects, the IAB node is a first IAB node, and the mobility state information is received from an MT of a second IAB node.

In a tenth additional aspect, alone or in combination with one or more of the first through ninth aspects, the mobility state information is received from a CU of another IAB donor.

In an eleventh additional aspect, alone or in combination with one or more of the first through tenth aspects, the IAB node is a first IAB node, and the wireless communication device is a DU of a second IAB node.

In a twelfth additional aspect, alone or in combination with one or more of the first through eleventh aspects, the mobility state information is received from an MT of the first IAB node.

In a thirteenth additional aspect, alone or in combination with one or more of the first through twelfth aspects, the mobility state information is received from an MT of a third IAB node.

In a fourteenth additional aspect, alone or in combination with one or more of the first through thirteenth aspects, receiving the mobility state information includes receiving the mobility state information in at least one of: an RRC message, DCI, a layer 1 reference signal, a MAC control element, a MIB, a RACH message, a SIB, a handover request message, or an SN addition request message.

In a fifteenth additional aspect, alone or in combination with one or more of the first through fourteenth aspects, receiving the mobility state information includes receiving the mobility state information in a communication that explicitly indicates the mobility state information.

In a sixteenth additional aspect, alone or in combination with one or more of the first through fifteenth aspects, receiving the mobility state information includes receiving the mobility state information in a communication that implicitly indicates the mobility state information.

In a seventeenth additional aspect, alone or in combination with one or more of the first through sixteenth aspects, the operation is associated with at least one of: IAB topology and resource management, local scheduling, beam management, beam tracking, synchronization tracking, positioning, QoS type support, an access procedure, or paging.

Figure 7:
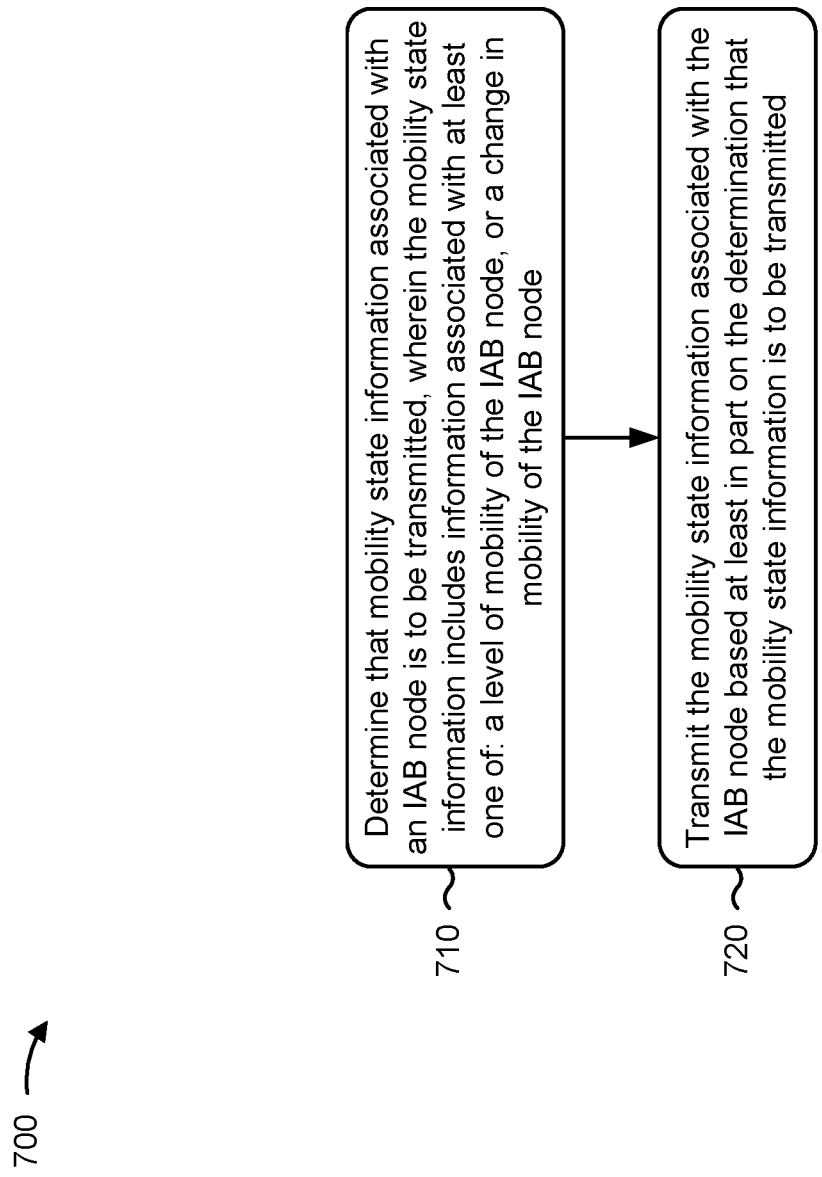
FIG. 7 is a diagram illustrating an example process performed by a wireless communication device that supports mobile IAB in accordance with various aspects of the present disclosure.

FIG. 7 is a diagram illustrating an example process 700 performed, for example, by a base station, in accordance with various aspects of the present disclosure. The process shown in FIG. 7 is an example where a wireless communication device (for example, base station 110, anchor base station 335, non-anchor base station 345, IAB donor 405, IAB node 410) performs operations associated with signaling to support mobile IAB.

As shown in FIG. 7, in some aspects, the example process may include determining that mobility state information associated with an IAB node is to be transmitted, wherein the mobility state information includes information associated with at least one of a level of mobility of the IAB node or a change in mobility of the IAB node (block 710). For example, the wireless communication device (for example, using transmit processor 220, receive processor 238, controller/processor 240, memory 242) may determine that mobility state information associated with an IAB is to be transmitted (for example, an IAB node 410), wherein the mobility state information includes information associated with at least one of a level of mobility of the IAB node or a change in mobility of the IAB node, as described above.

As further shown in FIG. 7, in some aspects, the example process may include transmitting the mobility state information associated with the IAB node based at least in part on the determination that the mobility state information is to be transmitted (block 720). For example, the wireless communication device (for example, using transmit processor 220, receive processor 238, controller/processor 240, memory 242) may transmit the mobility state information associated with the IAB node based at least in part on the determination that the mobility state information is to be transmitted, as described above.

The example process shown in FIG. 7 may include additional aspects, such as any single aspect or any combination of aspects described below or in connection with one or more other processes described elsewhere herein.

In a first additional aspect, the determination that the mobility state information is to be transmitted is based at least in part on an explicit request for the mobility state information associated with the IAB node.

In a second additional aspect, alone or in combination with the first aspect, the process 700 may further include receiving a reporting configuration for transmitting the mobility state information, and the mobility state information is transmitted based at least in part on the reporting configuration.

In a third additional aspect, alone or in combination with one or more of the first and second aspects, the reporting configuration indicates at least one of: periodic reporting of the mobility state information, aperiodic reporting of the mobility state information, or event-triggered reporting of the mobility state information.

In a fourth additional aspect, alone or in combination with one or more of the first through third aspects, transmitting the mobility state information includes transmitting the mobility state information to a CU of an IAB donor (for example, IAB donor 405).

In a fifth additional aspect, alone or in combination with one or more of the first through fourth aspects, the wireless communication device is a DU of the IAB node.

In a sixth additional aspect, alone or in combination with one or more of the first through fifth aspects, the IAB node is a first IAB node, and the wireless communication device is a DU of a second IAB node (for example, a second IAB node 410).

In a seventh additional aspect, alone or in combination with one or more of the first through sixth aspects, the wireless communication device is an MT of the IAB node.

In an eighth additional aspect, alone or in combination with one or more of the first through seventh aspects, the IAB node is a first IAB node, and the wireless communication device is an MT of a second IAB node.

In a ninth additional aspect, alone or in combination with one or more of the first through eighth aspects, transmitting the mobility state information includes transmitting the mobility state information to a CU of another IAB donor.

In a tenth additional aspect, alone or in combination with one or more of the first through ninth aspects, the IAB node is a first IAB node, and transmitting the mobility state information includes transmitting the mobility state information to a DU of a second IAB node.

In an eleventh additional aspect, alone or in combination with one or more of the first through tenth aspects, the wireless communication device is an MT of the first IAB node.

In a twelfth additional aspect, alone or in combination with one or more of the first through eleventh aspects, the wireless communication device is an MT of a third IAB node.

In a thirteenth additional aspect, alone or in combination with one or more of the first through twelfth aspects, transmitting the mobility state information includes transmitting the mobility state information in at least one of: an RRC message, DCI, a layer 1 reference signal, a MAC control element, a MIB, a RACH message, a SIB, a handover request message, or an SN addition request message.

In a fourteenth additional aspect, alone or in combination with one or more of the first through thirteenth aspects, transmitting the mobility state information includes transmitting the mobility state information in a communication that explicitly indicates the mobility state information.

In a fifteenth additional aspect, alone or in combination with one or more of the first through fourteenth aspects, transmitting the mobility state information includes transmitting the mobility state information in a communication that implicitly indicates the mobility state information.

Although FIG. 7 shows example blocks of process 700, in some aspects, process 700 may include additional blocks, fewer blocks, different blocks, or differently arranged blocks than those depicted in FIG. 7. Additionally, or alternatively, two or more of the blocks of process 700 may be performed in parallel.

Figure 8:
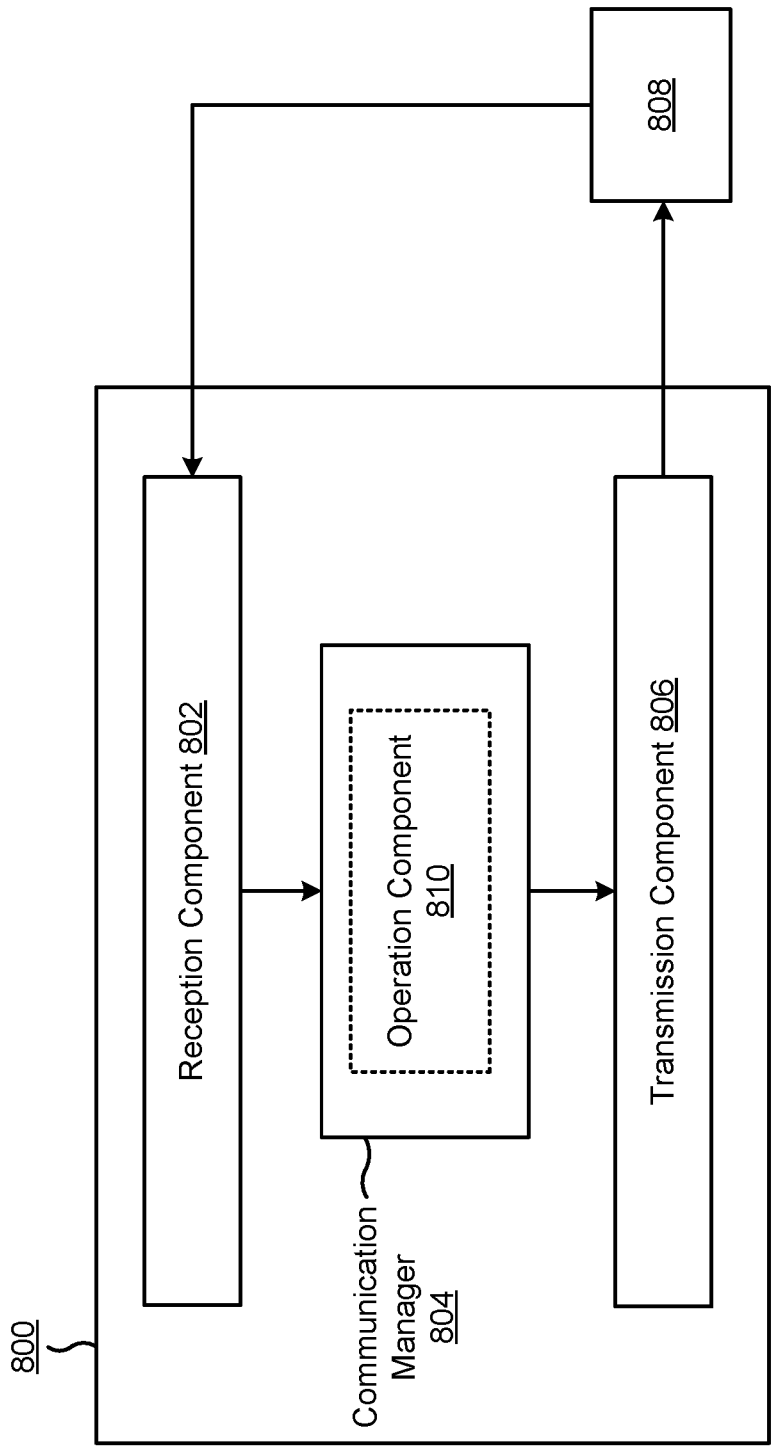
FIGS. 8 and 9 are block diagrams of example apparatuses for wireless communication in accordance with various aspects of the present disclosure.

FIG. 8 is a block diagram of an example apparatus 800 for wireless communication in accordance with various aspects of the present disclosure. The apparatus 800 may be a wireless communication device, or a wireless communication device may include the apparatus 800. In some aspects, the apparatus 800 includes a reception component 802, a communication manager 804, and a transmission component 806, which may be in communication with one another (for example, via one or more buses). As shown, the apparatus 800 may communicate with another apparatus 808 (such as a UE, a base station, or another wireless communication device) using the reception component 802 and the transmission component 806.

In some aspects, the apparatus 800 may be configured to perform one or more operations described herein in connection with FIG. 5. Additionally or alternatively, the apparatus 800 may be configured to perform one or more processes described herein, such as process 600 of FIG. 6. In some aspects, the apparatus 800 may include one or more components of the wireless communication device described above in connection with FIG. 2.

The reception component 802 may receive communications, such as reference signals, control information, data communications, or a combination thereof, from the apparatus 808. The reception component 802 may provide received communications to one or more other components of the apparatus 800, such as the communication manager 804. In some aspects, the reception component 802 may perform signal processing on the received communications (such as filtering, amplification, demodulation, analog-to-digital conversion, demultiplexing, deinterleaving, de-mapping, equalization, interference cancellation, or decoding, among other examples), and may provide the processed signals to the one or more other components. In some aspects, the reception component 802 may include one or more antennas, a demodulator, a MIMO detector, a receive processor, a controller/processor, a memory, or a combination thereof, of the wireless communication device described above in connection with FIG. 2.

The transmission component 806 may transmit communications, such as reference signals, control information, data communications, or a combination thereof, to the apparatus 808. In some aspects, the communication manager 804 may generate communications and may transmit the generated communications to the transmission component 806 for transmission to the apparatus 808. In some aspects, the transmission component 806 may perform signal processing on the generated communications (such as filtering, amplification, modulation, digital-to-analog conversion, multiplexing, interleaving, mapping, or encoding, among other examples), and may transmit the processed signals to the apparatus 808. In some aspects, the transmission component 806 may include one or more antennas, a modulator, a transmit MIMO processor, a transmit processor, a controller/processor, a memory, or a combination thereof, of the wireless communication device described above in connection with FIG. 2. In some aspects, the transmission component 806 may be collocated with the reception component 802 in a transceiver.

In some aspects, the communication manager 804 may receive or may cause the reception component 802 to receive mobility state information associated with an IAB node. Here, the mobility state information may include information associated with at least one of a level of mobility of the IAB node or a change in mobility of the IAB node. In some aspects, the communication manager 804 may perform an operation based at least in part on the mobility state information associated with the IAB node. In some aspects, the communication manager 804 may include a controller/processor, a memory, a scheduler, a communication unit, or a combination thereof, of the wireless communication device described above in connection with FIG. 2.

In some aspects, the communication manager 804 may request or may cause the reception component 802 to request the mobility state information associated with the IAB node. Here, the mobility state information may be received based at least in part on the request.

In some aspects, the communication manager 804 may provide or may cause the transmission component 806 to provide a reporting configuration for transmitting the mobility state information associated with the IAB node. Here, the mobility state information may be received based at least in part on the reporting configuration.

In some aspects, the communication manager 804 may include a set of components, such as an operation component 810. Alternatively, the set of components may be separate and distinct from the communication manager 804. In some aspects, one or more components of the set of components may include or may be implemented within a controller/processor, a memory, a scheduler, a communication unit, or a combination thereof, of the wireless communication device described above in connection with FIG. 2. Additionally or alternatively, one or more components of the set of components may be implemented at least in part as software stored in a memory. For example, a component (or a portion of a component) may be implemented as instructions or code stored in a non-transitory computer-readable medium and executable by a controller or a processor to perform the functions or operations of the component.

The reception component 802 may receive mobility state information associated with an IAB node, the mobility state information including information associated with a level of mobility of the IAB node, or a change in mobility of the IAB node.

The operation component 810 may perform an operation based at least in part on the mobility state information associated with the IAB node.

The number and arrangement of components shown in FIG. 8 are provided as an example. In practice, there may be additional components, fewer components, different components, or differently arranged components than those shown in FIG. 8. Furthermore, two or more components shown in FIG. 8 may be implemented within a single component, or a single component shown in FIG. 8 may be implemented as multiple, distributed components. Additionally or alternatively, a set of (one or more) components shown in FIG. 8 may perform one or more functions described as being performed by another set of components shown in FIG. 8.

Figure 9:
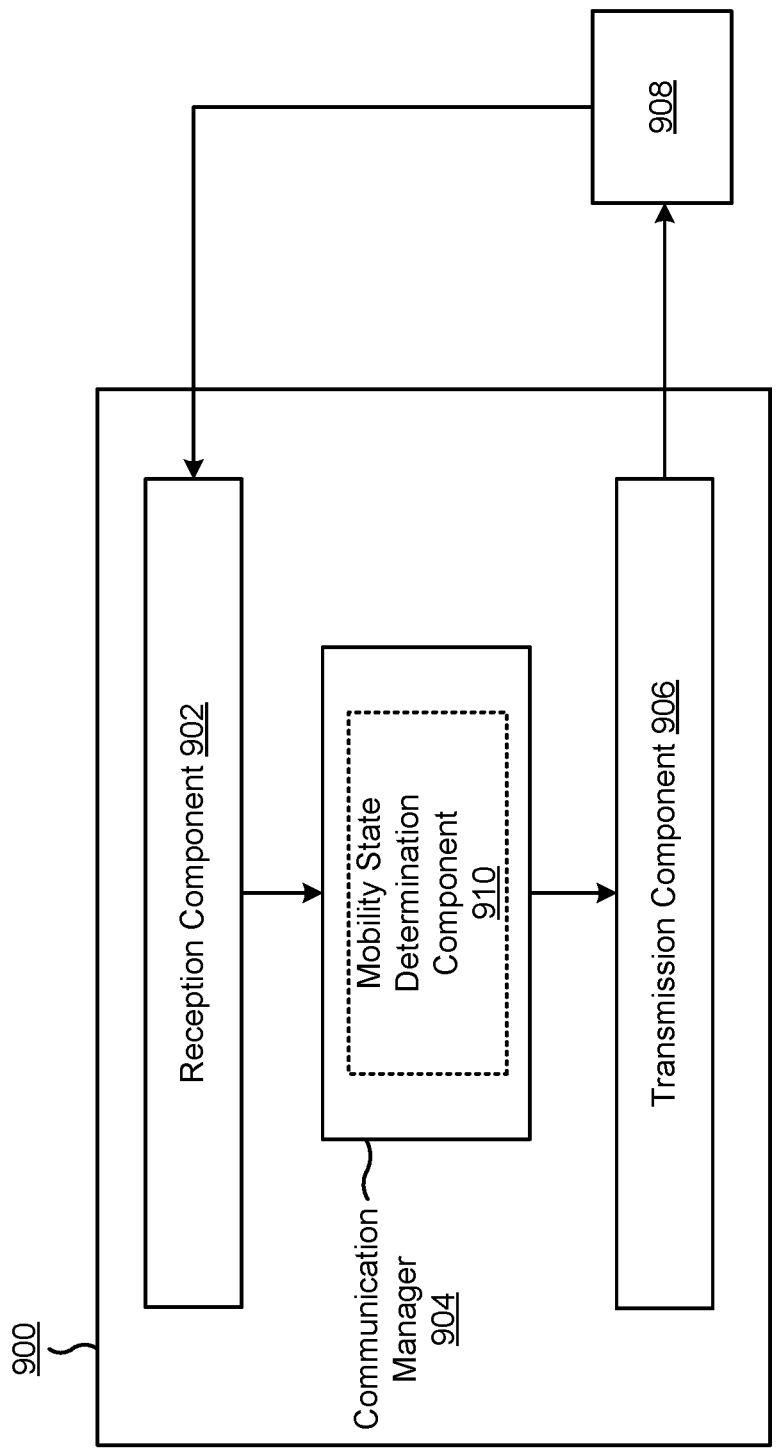

FIG. 9 is a block diagram of an example apparatus 900 for wireless communication in accordance with various aspects of the present disclosure. The apparatus 900 may be a wireless communication device, or a wireless communication device may include the apparatus 900. In some aspects, the apparatus 900 includes a reception component 902, a communication manager 904, and a transmission component 906, which may be in communication with one another (for example, via one or more buses). As shown, the apparatus 900 may communicate with another apparatus 908 (such as a UE, a base station, or another wireless communication device) using the reception component 902 and the transmission component 906.

In some aspects, the apparatus 900 may be configured to perform one or more operations described herein in connection with FIG. 5. Additionally or alternatively, the apparatus 900 may be configured to perform one or more processes described herein, such as process 700 of FIG. 7. In some aspects, the apparatus 900 may include one or more components of the wireless communication device described above in connection with FIG. 2.

The reception component 902 may receive communications, such as reference signals, control information, data communications, or a combination thereof, from the apparatus 908. The reception component 902 may provide received communications to one or more other components of the apparatus 900, such as the communication manager 904. In some aspects, the reception component 902 may perform signal processing on the received communications (such as filtering, amplification, demodulation, analog-to-digital conversion, demultiplexing, deinterleaving, de-mapping, equalization, interference cancellation, or decoding, among other examples), and may provide the processed signals to the one or more other components. In some aspects, the reception component 902 may include one or more antennas, a demodulator, a MIMO detector, a receive processor, a controller/processor, a memory, or a combination thereof, of the wireless communication device described above in connection with FIG. 2.

The transmission component 906 may transmit communications, such as reference signals, control information, data communications, or a combination thereof, to the apparatus 908. In some aspects, the communication manager 904 may generate communications and may transmit the generated communications to the transmission component 906 for transmission to the apparatus 908. In some aspects, the transmission component 906 may perform signal processing on the generated communications (such as filtering, amplification, modulation, digital-to-analog conversion, multiplexing, interleaving, mapping, or encoding, among other examples), and may transmit the processed signals to the apparatus 908. In some aspects, the transmission component 906 may include one or more antennas, a modulator, a transmit MIMO processor, a transmit processor, a controller/processor, a memory, or a combination thereof, of the wireless communication device described above in connection with FIG. 2. In some aspects, the transmission component 906 may be collocated with the reception component 902 in a transceiver.

In some aspects, the communication manager 904 may determine that mobility state information associated with an IAB node is to be transmitted. Here, the mobility state information may include information associated with at least one of a level of mobility of the IAB node, or a change in mobility of the IAB node. The communication manager 904 may transmit or may cause the transmission component 906 to transmit the mobility state information associated with the IAB node based at least in part on the determination that the mobility state information is to be transmitted. In some aspects, the communication manager 904 may include a controller/processor, a memory, a scheduler, a communication unit, or a combination thereof, of the wireless communication device described above in connection with FIG. 2.

In some aspects, the determination that the mobility state information is to be transmitted is based at least in part on an explicit request for the mobility state information associated with the IAB node.

In some aspects, the communication manager 804 may receive or may cause the reception component 802 to receive a reporting configuration for transmitting the mobility state information associated with the IAB node. Here, the communication manager 804 may transmit or may cause the transmission component 806 to transmit the mobility state information is based at least in part on the reporting configuration.

In some aspects, the communication manager 904 may include a set of components, such as a mobility state determination component 910. Alternatively, the set of components may be separate and distinct from the communication manager 904. In some aspects, one or more components of the set of components may include or may be implemented within a controller/processor, a memory, a scheduler, a communication unit, or a combination thereof, of the wireless communication device described above in connection with FIG. 2. Additionally or alternatively, one or more components of the set of components may be implemented at least in part as software stored in a memory. For example, a component (or a portion of a component) may be implemented as instructions or code stored in a non-transitory computer-readable medium and executable by a controller or a processor to perform the functions or operations of the component.

The mobility state determination component 910 may determine that mobility state information associated with an IAB node is to be transmitted, the mobility state information including information associated with at least one of a level of mobility of the IAB node, or a change in mobility of the IAB node. In some aspects, the mobility state determination component 910 may determine characteristics of motion of the IAB node and may determine a mobility state and/or mobility state information associated with the IAB node based on the characteristics. The transmission component 906 may transmit the mobility state information associated with the IAB node based at least in part on the determination that the mobility state information is to be transmitted.

The number and arrangement of components shown in FIG. 9 are provided as an example. In practice, there may be additional components, fewer components, different components, or differently arranged components than those shown in FIG. 9. Furthermore, two or more components shown in FIG. 9 may be implemented within a single component, or a single component shown in FIG. 9 may be implemented as multiple, distributed components. Additionally or alternatively, a set of (one or more) components shown in FIG. 9 may perform one or more functions described as being performed by another set of components shown in FIG. 9.

The foregoing disclosure provides illustration and description, but is not intended to be exhaustive or to limit the aspects to the precise form disclosed. Modifications and variations may be made in light of the above disclosure or may be acquired from practice of the aspects.

As used herein, the term "component" is intended to be broadly construed as hardware, firmware, or a combination of hardware and software. As used herein, a processor is implemented in hardware, firmware, or a combination of hardware and software.

Some aspects are described herein in connection with thresholds. As used herein, satisfying a threshold may, depending on the context, refer to a value being greater than the threshold, greater than or equal to the threshold, less than the threshold, less than or equal to the threshold, equal to the threshold, not equal to the threshold, or combinations thereof.

It will be apparent that systems or methods described herein may be implemented in different forms of hardware, firmware, or a combination of hardware and software. The actual specialized control hardware or software code used to implement these systems or methods is not limiting of the aspects. Thus, the operation and behavior of the systems or methods were described herein without reference to specific software code—it being understood that software and hardware can be designed to implement the systems or methods based, at least in part, on the description herein.

Even though particular combinations of features are recited in the claims or disclosed in the specification, these combinations are not intended to limit the disclosure of various aspects. In fact, many of these features may be combined in ways not specifically recited in the claims or disclosed in the specification. Although each dependent claim listed below may directly depend on only one claim, the disclosure of various aspects includes each dependent claim in combination with every other claim in the claim set. A phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (for example, a-a, a-a-a, a-a-b, a-a-c, a-b-b, a-c-c, b-b, b-b-b, b-b-c, c-c, and c-c-c or any other ordering of a, b, and c).

No element, act, or instruction used herein is to be construed as critical or essential unless explicitly described as such. Also, as used herein, the articles "a" and "an" are intended to include one or more items, and may be used interchangeably with "one or more." Furthermore, as used herein, the terms "set" and "group" are intended to include one or more items (for example, related items, unrelated items, a combination of related and unrelated items, or combinations thereof), and may be used interchangeably with "one or more." Where only one item is intended, the phrase "only one" or similar language is used. Also, as used herein, the terms "has," "have," "having," or combinations thereof are intended to be open-ended terms. Further, the phrase "based on" is intended to mean "based, at least in part, on" unless explicitly stated otherwise.

What is claimed is:

1. A first integrated access backhaul (IAB) donor node for wireless communication, comprising:
    one or more memories; and
    one or more processors, coupled to the one or more memories, configured to:
        determine that mobility state information, associated with the first IAB donor node or a second IAB node, is to be transmitted based at least in part on at least one of a request for the mobility state information, an indication for the mobility state information, or a reporting configuration for transmitting the mobility state information, wherein the mobility state information includes information indicating whether the first IAB donor node or the second IAB node is capable of motion or being moved; and
        transmit the mobility state information based at least in part on determining that the mobility state information is to be transmitted.

2. The first IAB donor node of claim 1, wherein the second IAB node is a child node of the first IAB donor node.

3. The first IAB donor node of claim 1, wherein the one or more processors, to determine that the mobility state information is to be transmitted, are configured to:
    detect the second IAB node based at least in part on the at least one of the request, the indication, or the reporting configuration; and
    determine that the mobility state information, associated with the second IAB node, is to be transmitted based at least in part on detecting the second IAB node.

4. The first IAB donor node of claim 1, wherein the one or more processors, to transmit the mobility state information, are configured to transmit the mobility state information to a third IAB node different than the second IAB node.

5. The first IAB donor node of claim 1, wherein the one or more processors, to transmit the mobility state information, are configured to transmit the mobility state information via handover request message.

6. The first IAB donor node of claim 4, wherein the one or more processors, to transmit the mobility state information to the third IAB node, are configured to transmit the mobility state information to a distributed unit of the third IAB node.

7. The first IAB donor node of claim 4, wherein the third JAB node is a second IAB donor node and wherein transmitting the mobility state information to the third JAB node comprises transmitting the mobility state information to a central unit of the second IAB donor node.

8. The first IAB donor node of claim 1, wherein the one or more processors, to transmit the mobility state information, are configured to transmit the mobility state information via an X2/Xn interface.

9. The first IAB donor node of claim 1, wherein the one or more processors are further configured to receive the reporting configuration.

10. The first IAB donor node of claim 1, wherein the one or more processors, to determine that the mobility state information is to be transmitted, are configured to:
    detect an event, for transmitting the mobility state information, indicated in the reporting configuration; and
    determine that the mobility state information is to be transmitted based at least in part on detecting the event.

11. The first IAB donor node of claim 1, wherein the one or more processors, to transmit the mobility state information, are configured to transmit the mobility state information in a communication that explicitly indicates the mobility state information.

12. The first IAB donor node of claim 1, wherein the one or more processors, to transmit the mobility state information, are configured to transmit the mobility state information in a communication that implicitly indicates the mobility state information via a set of resources over which the communication is transmitted.

13. A method of wireless communication performed by a first integrated access backhaul (IAB) donor node, the method comprising:
    determining that mobility state information, associated with the first IAB donor node or a second IAB node, is to be transmitted based at least in part on at least one of a request for the mobility state information, an indication for the mobility state information, or a reporting configuration for transmitting the mobility state information, wherein the mobility state information includes information indicating whether the first IAB donor node or the second IAB node is capable of motion or being moved; and
    transmitting the mobility state information based at least in part on determining that the mobility state information is to be transmitted.

14. The method of claim 13, wherein the second IAB node is a child node of the first IAB donor node.

15. The method of claim 13, wherein determining that the mobility state information is to be transmitted comprises:
    detecting the second IAB node based at least in part on the at least one of the request, the indication, or the reporting configuration; and
    determining that the mobility state information, associated with the second IAB node, is to be transmitted based at least in part on detecting the second IAB node.

16. The method of claim 13, wherein transmitting the mobility state information comprises transmitting the mobility state information to a third IAB node different than the second IAB node.

17. The method of claim 13, wherein transmitting the mobility state information comprises transmitting the mobility state information to via a handover message.

18. The method of claim 16, wherein transmitting the mobility state information to the third IAB node comprises transmitting the mobility state information to a distributed unit of the third IAB node.

19. The method of claim 16, wherein the third IAB node is a second IAB donor node and wherein transmitting the mobility state information to the third IAB node comprises transmitting the mobility state information to a central unit of the second IAB donor node.

20. The method of claim 13, wherein transmitting the mobility state information comprises transmitting the mobility state information to via an X2/Xn interface.

21. The method of claim 13, further comprising receiving the reporting configuration.

22. The method of claim 13, wherein determining that the mobility state information is to be transmitted comprises:
    detecting an event, for transmitting the mobility state information, indicated in the reporting configuration; and
    determining that the mobility state information is to be transmitted based at least in part on detecting the event.

23. The method of claim 13, wherein transmitting the mobility state information comprises transmitting the mobility state information in a communication that explicitly indicates the mobility state information.

24. The method of claim 13, wherein transmitting the mobility state information comprises transmitting the mobility state information in a communication that implicitly indicates the mobility state information via a set of resources over which the communication is transmitted.

\* \* \* \* \*